United States Patent [19]

Allen et al.

[11] Patent Number: 5,500,913
[45] Date of Patent: Mar. 19, 1996

[54] APPARATUS AND METHOD OF FABRICATING DIRECTIONAL FIBER OPTIC TAPS, SENSORS AND OTHER DEVICES WITH VARIABLE ANGLE OUTPUT

[75] Inventors: Susan D. Allen, Iowa City; Changhun Lee, Coralville, both of Iowa

[73] Assignee: Administrators of the Tulane Educational Fund, New Orleans, La.

[21] Appl. No.: 31,364

[22] Filed: Mar. 15, 1993

[51] Int. Cl.$^6$ .............................. G02B 6/26; B23K 26/00
[52] U.S. Cl. .................... 385/48; 385/15; 385/27; 385/31; 385/39; 385/42; 219/121.6; 219/121.61; 219/121.67; 219/121.68; 219/121.69
[58] Field of Search ................. 385/12, 13, 15, 385/24, 25, 27, 28, 29, 30, 31, 32, 33, 34, 35, 39, 42, 43, 44, 46, 48, 51; 219/121.6, 121.61, 121.65, 121.66, 121.67, 121.68, 121.69, 121.78, 121.8, 121.81, 121.83

[56] References Cited

U.S. PATENT DOCUMENTS

| 4,380,365 | 4/1983 | Gross | 385/33 |
|---|---|---|---|
| 5,059,763 | 10/1991 | O'Brien et al. | 219/121.69 |
| 5,101,090 | 3/1992 | Coyle, Jr. et al. | 219/121.68 |
| 5,130,512 | 7/1992 | Coyle, Jr. et al. | 219/121.68 |
| 5,135,555 | 8/1992 | Coyle, Jr. et al. | 65/12 |
| 5,256,851 | 10/1993 | Presby | 219/121.69 |

OTHER PUBLICATIONS

Paparao et al, "Design and performance optimization ... filters", Applied Optics, vol. 30 (14), 10 May 1991 pp. 1826–1838.
Imen et al, "Laser-fabricated fiber–optic taps", Optics Letters, vol. 15 (17), Sep. 1, 1990, pp. 950–952.
Ghosh et al, "Design of Fiber Optic ... Signals", Optical Information Processing, 2 Proc. SPIE, vol. 1347. 1990 (no month available), pp. 1–12.
Ghosh, "Design of fiber optic ... networks", and Guidelines for the design ... filters, Optical Society of America, 1989 Annual Mtg., Oct. 15–20, 1989.
Frank et al, Program Abstracts, 102nd Session, Iowa Academy of Science, Drake University, Apr. 20–21, 1990.
Ghosh et al, "Design of adaptive ... systems", SPIE vol. 1371, High–Frequency Analog Fiber Optic Systems (1990), pp. 170–181 (no month available).
Agrawalla et al, "Laser ablative ... $SiO_2$", J. Vac. Sci. Technol. B 5(2), Mar./Apr. 1987, pp. 601–605.
Ghosh et al, "Arithmetic Fourier–transform ... processors" J. Opt. Soc. Am. A, vol. 7 (4), Apr. 1990, pp. 701–707.
Imen et al, "laser fabricated fiber optical ... devices", SPIE vol. 1365, Components for Fiber Optic Applications V (1990), pp. 60–64 (no month available).
Ghosh et al, "The Arithmetic Fourier ... Processors", Proc. SPIE, vol. 1058, 1989 (no month available), pp. 72–88.
Paparao et al, "Improved arithmetic Fourier transform algorithm", Applied Optics, vol. 30, No. 35, 10 Dec. 1991, pp. 5115–5118.
Lee et al, "Laser Micromachining ... taps", CLEO 1991 Conference (no month available).

*Primary Examiner*—Brian Healy
*Attorney, Agent, or Firm*—Mark L. Fleshner

[57] ABSTRACT

An apparatus and method for fabricating directional fiber optic taps having a variety of output angles. The taps can be used to monitor losses due to misalignment of the fiber or losses due to bending and straining of the fiber. The apparatus and method can also be used to fabricate taps which filter out higher order modes in a fiber. The apparatus and method can also be used to produce taps which can be used in a position or refractive index measuring system.

48 Claims, 32 Drawing Sheets

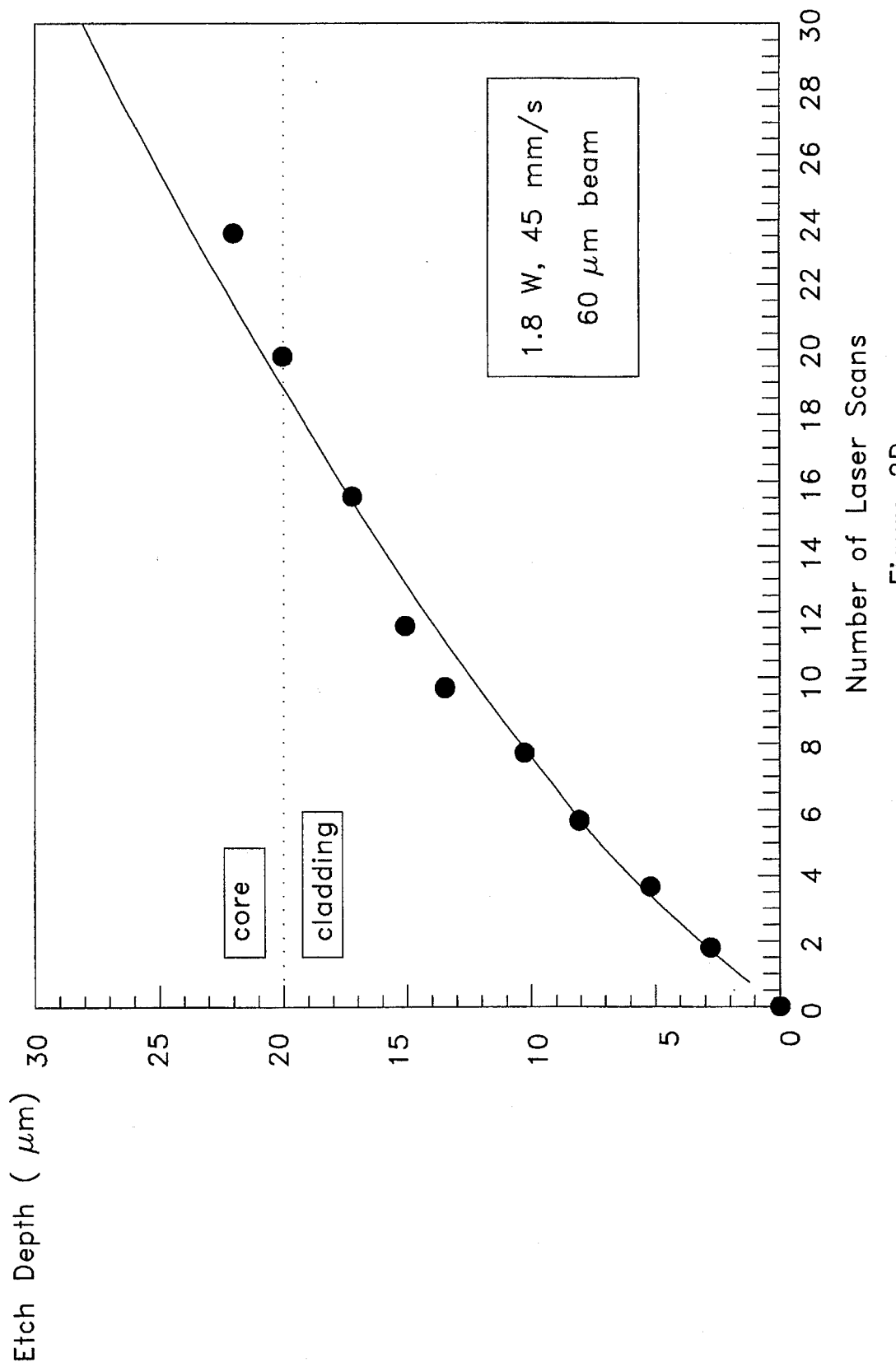

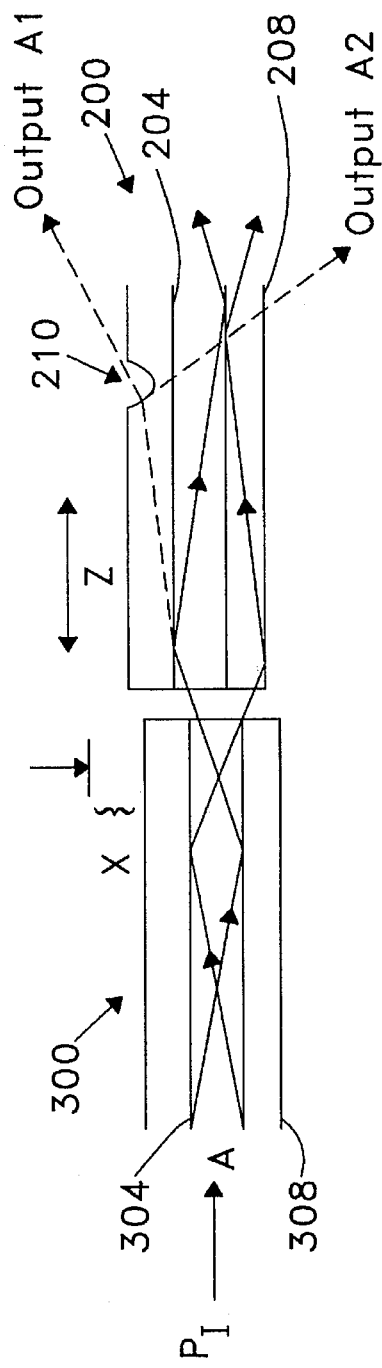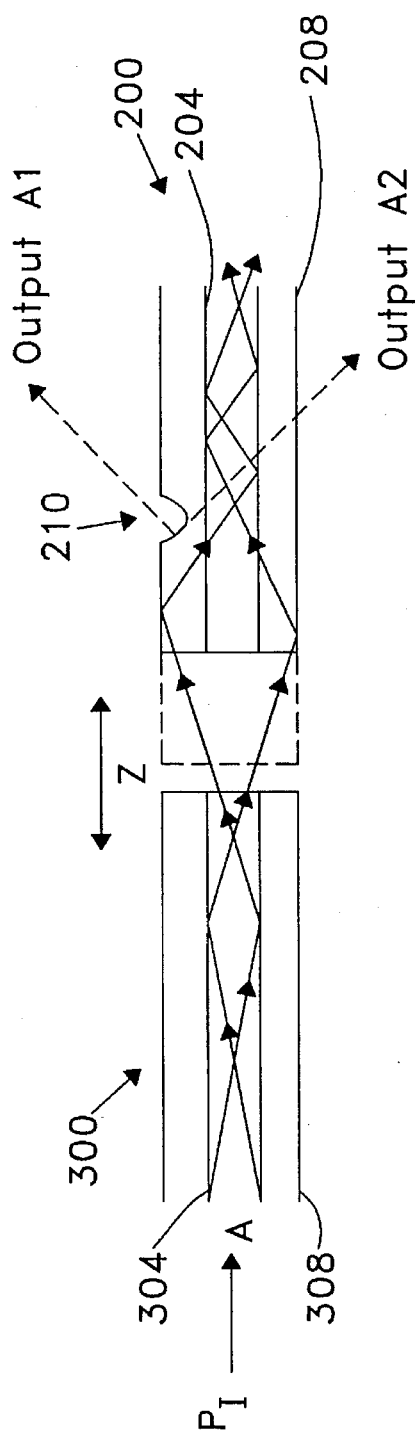
Figure 6A
Figure 6B

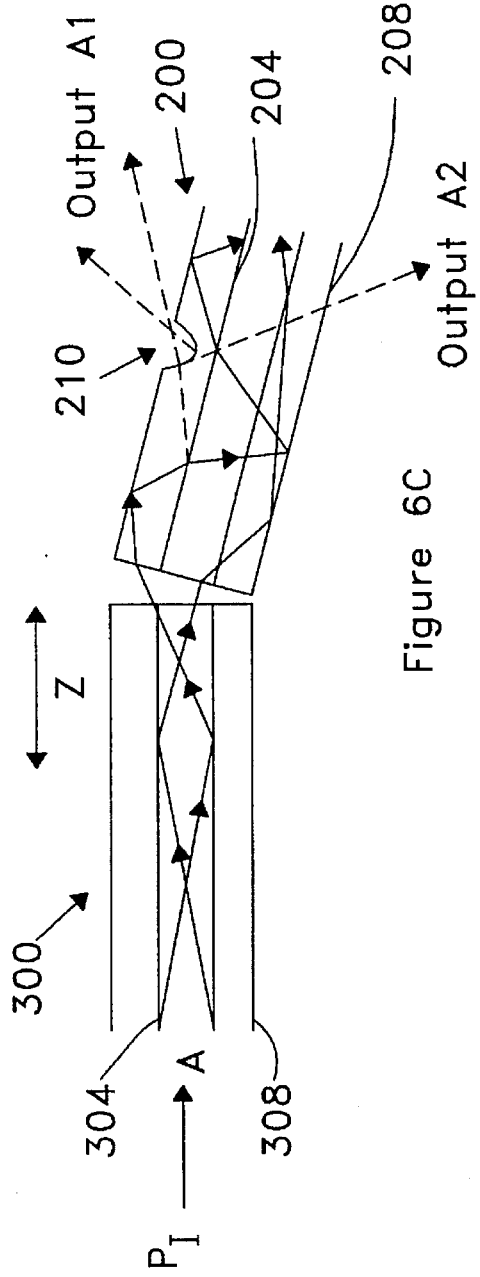
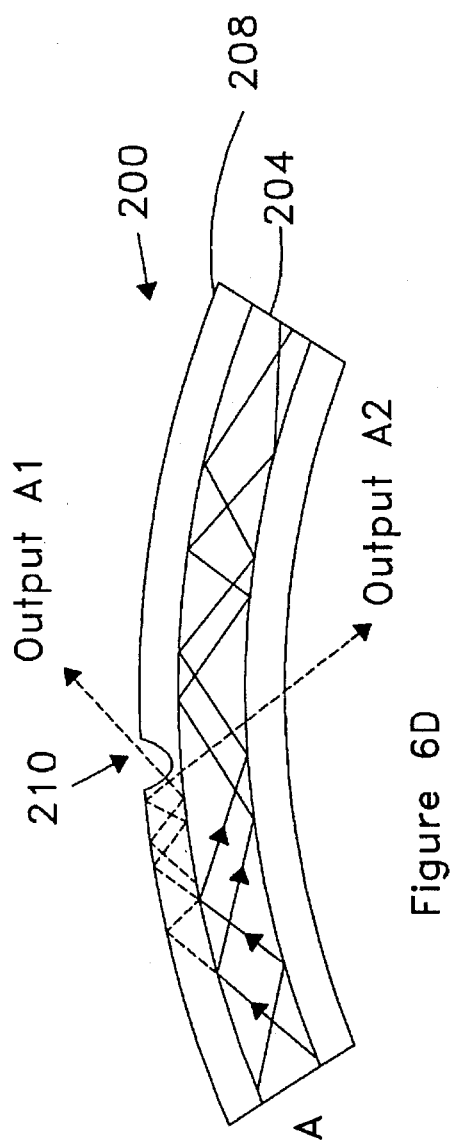
Figure 6C
Figure 6D

* 10 W, 70 mm/s

APPARATUS AND METHOD OF FABRICATING DIRECTIONAL FIBER OPTIC TAPS, SENSORS AND OTHER DEVICES WITH VARIABLE ANGLE OUTPUT

BACKGROUND OF THE INVENTION

1. Field of the Invention

This invention relates generally to an apparatus and method for fabricating directional optical taps, sensors and other devices with variable angle tap outputs into optical fibers and to the optical taps themselves. This invention also relates to a method and apparatus for making optical sensors, for example, sensors for determining optical fiber misalignment losses with other optical devices, strain losses in optical fibers and optical mode filters. This invention also relates to a method and apparatus for measuring position of an object and refractive index of liquids.

2. Background of the Related Art

Optical fibers are replacing wires in telecommunication systems, data link systems such as local area networks (LANs) and sensor systems such as "fly-by-light" systems in aircraft. Optical fibers are advantageous in these systems because fibers can carry significantly more information than electrical wires. For example, an optical fiber can carry up to 5 billion bits per second whereas a wire can carry a maximum of 150 million bps. In addition, optical fibers are reliable and more compact than the electrical wires they replace. Also, optical fibers do not produce electro-magnetic interferences nor are the signals they transmit effected by electro-magnetic disturbances.

Losses are encountered in any couplings between an optical device (e.g. a laser, an optical modulator, an optical waveguide etc . . . ) and a fiber or between two fibers. Installation and upkeep of these couplings represents a costly aspect of fiber optic telecommunication systems, fiber optic LANs and fiber optic sensor systems. One reason for this is that installation of optical devices must be done by hand using specially trained and expensive technicians. It is therefore desirable to be able to conveniently and inexpensively couple information from an optical device or fiber to another optical fiber.

Another problem with current optical couplings is that they can produce significant signal losses. One reason for this is that optical fibers have very small fiber cores, (the diameter of fiber core is typically between a few micrometers to a several hundred micrometers) making it difficult to align and maintain alignment between optical devices and fibers or between two fibers. It is even more difficult to couple a bundle of optical fibers contained in optical cables with other optical devices or another bundle of fibers. It is therefore desirable to be able to conveniently and non-intrusively determine whether the coupling is producing losses insuring minimal signal loss at the connector.

In addition to coupling losses which occur at couplings between optical devices and fibers, additional losses can occur due to bending or straining optical fibers. In such situations, a significant amount of radiation is lost due to guided cladding modes and radiation (leaky) modes.

Optical time domain reflectometry (OTDR) has been used as a distributed reflective loss monitor in such optical data link systems. OTDR systems involve sending a pulse of monochromatic light of a known power level into one end of a particular fiber link in the fiber optic system and measuring the reflected power level due to discontinuities such as splices, connectors or fiber breaks. This approach does not however locate the strain or misalignment in short distances or in complicated local area networks. Also, this type of OTDR requires significant additional complicated components as well as access to the end of the fiber in order to launch the laser pulses into the fiber.

Another technique for status monitoring in optical fibers involves using clip-on optical components or sandwiching optical fiber between a grating and a lens. These clip-on optical components couple a small amount of laser light out of the fiber core. However, such clip-on components are not suitable for long-term installation because they place a high stress on the optical fiber which can generate microcracks. Consequently, it is advantageous to have a simple, non-intrusive, long-term technique to determine whether strains and misalignment are being placed on optical fibers in any type of fiber system without disconnecting any fibers in the system.

In addition to providing a convenient and inexpensive approach to minimizing losses due to couplings, it is desirable to replace electrical sensing systems such as electrical position sensing systems with optical sensing systems such as optical position sensor systems. Fiber optic sensing systems offer numerous advantages over conventional electrical sensing systems because they are small and light weight. It is even more advantageous if sensors in the sensing system are completely passive optical components, i.e., they have no active electro-optic components such as semiconductor lasers or light emitting diodes. Passive sensors are desirable because they would be immune from electromagnetic interference (EMI) which occurs near power lines and they would also be immune from electromagnetic pulses (EMP) which can occur in the event of a nuclear explosion. EMI/EMP immunity is especially important advantage for new generation aircraft which have skins made of composite materials.

Smart skin technology relies on embedding a plurality of passive optical sensors in a structure such as an aircraft wing. Smart skin technology can be used to passively measure strain or other local deviations of parameters such as strains or temperatures with a particular spacial resolution, wherein a large number of optical sensors produces a high spacial resolution. Consequently, it is desirable to be able to fabricate optical fiber with a large number of optical sensors, which can be used in smart screen structures.

SUMMARY OF THE INVENTION

It is therefore an object of the invention to provide a method and apparatus for fabricating directional optical taps.

Another object is to be able to fabricate optical taps with known geometry.

Another object of the invention is to provide an optical fiber having at least one optical tap which filters higher order optical modes from an optical fiber.

Another object of the invention is to provide a long-term, non-intrusive apparatus and method for monitoring strain on optical fibers.

Another object of the invention is to provide a non-intrusive apparatus and method for monitoring alignment between optical fibers and optical devices.

Another object of the invention is to provide a method and apparatus for determining position of an object.

Another object of the invention is to provide a method and apparatus for determining refractive index of a material.

One advantage of the invention is that it can be used to precisely fabricate a variety of optical taps for a variety of applications.

Another advantage of the invention is that it can be used to fabricate optical taps with a known geometry.

Another advantage of the invention is that it simplifies monitoring optical couplers.

Another advantage of the invention is that it is non-destructive.

Another advantage of the invention is that it enables fiber strain losses to be monitored.

Another advantage of the invention is that it enables connector losses to be monitored.

Another advantage of the invention is that it can measure position of an object using passive optical components near the object.

Another advantage of the invention is that it can measure position of an object without high frequency modulation of a light source.

One feature of the invention is that it uses laser ablative chemical etching to fabricate directional optical taps.

Another feature of the invention is that it can be programmed to fabricate taps having specific geometric features.

Another feature of the invention is that it scans an appropriately focussed energy source across a fiber.

An alternative feature of the invention is that it uses a pulsed laser to ablate fiber cladding.

Another feature of the invention is that it focusses a beam of light on a fiber in a known manner to ablate fiber cladding.

Another feature of the invention is that it uses a mount having a receptor for receiving a portable power testing insert.

These and other objects, advantages and features are accomplished by the provision of an apparatus for fabricating a tap in an optical fiber having an optical axis, including: an energy source for outputting a beam of energy at a threshold power; beam directing means for the beam of energy toward the fiber at an angle $\phi$ from the optical axis of the fiber, thereby fabricating the tap in the fiber.

These and other objects, advantages and features are also accomplished by the provision of a fiber having a tap fabricated using the above apparatus.

These and other objects, advantages and features are further accomplished by the provision of a method for fabricating a tap in an optical fiber having an optical axis, including the steps of: outputting a beam of energy at a threshold power; directing the beam of energy across the fiber at an angle $\phi$ from the optical axis of the fiber, thereby fabricating the tap in the fiber.

These and other objects, advantages and features are also accomplished by the provision of a fiber having a tap fabricated using the above method.

These and other objects, advantages and features are also accomplished by the provision of a sensing system including: a light source for outputting an optical signal; a fiber having a first end, a second end and a tap, the fiber receiving the optical signal at the first end, guiding the optical signal to the second end and guiding a portion of the optical signal as a return signal traveling toward the first end, wherein the tap couples a portion of the return signal out of the fiber as a tap signal; and a detector for detecting the tap signal.

These and other objects, advantages and features are also accomplished by the provision of a method for sensing a parameter, comprising the steps of: outputting an optical signal; receiving the optical signal at a first end of a fiber; guiding the optical signal to a second end of the fiber; guiding a portion of the optical signal as a return signal traveling toward the first end; coupling a portion of the return signal out of the fiber as a tap signal; and detecting the tap signal.

The above and other objects, effects, features and advantages of the present invention will become more apparent from the following description of embodiments thereof taken in conjunction with the accompanying drawings.

BRIEF DESCRIPTION OF THE DRAWINGS

FIG. 2D shows etch depth $d_{etch}$ versus number of scans for a 1.8W $CO_2$ laser with scanning rate dx/dt=45 mm/s.

FIGS. 6A–6D show four different situations which can change the intensity at outputs A1 and A2 and consequently also cause a loss in intensity of core modes.

DETAILED DESCRIPTION OF PREFERRED EMBODIMENTS

Figure 1A:
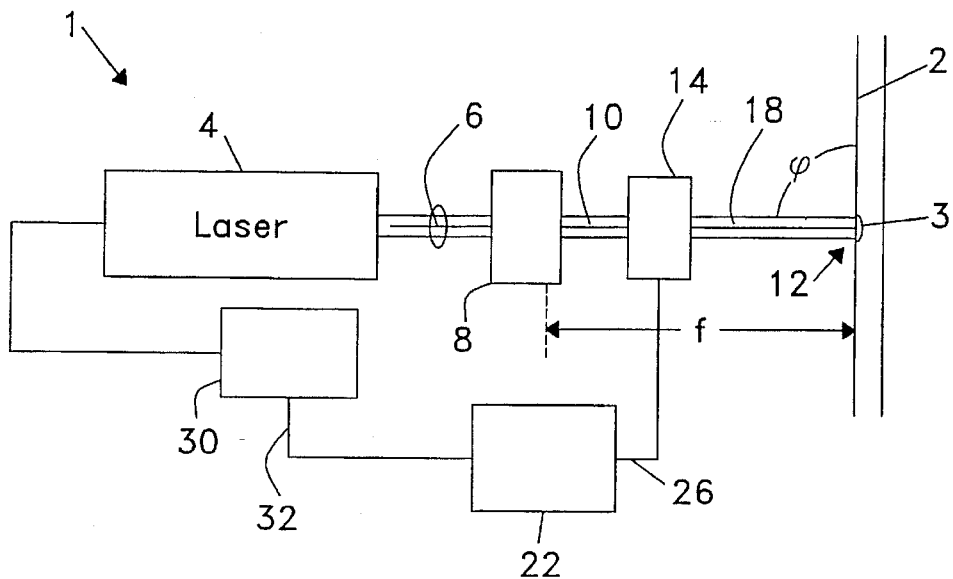
FIGS. 1A and 1B show a side and top view, respectively, of a tap fabricating system 1 according to one embodiment of the invention
Figure 1B:
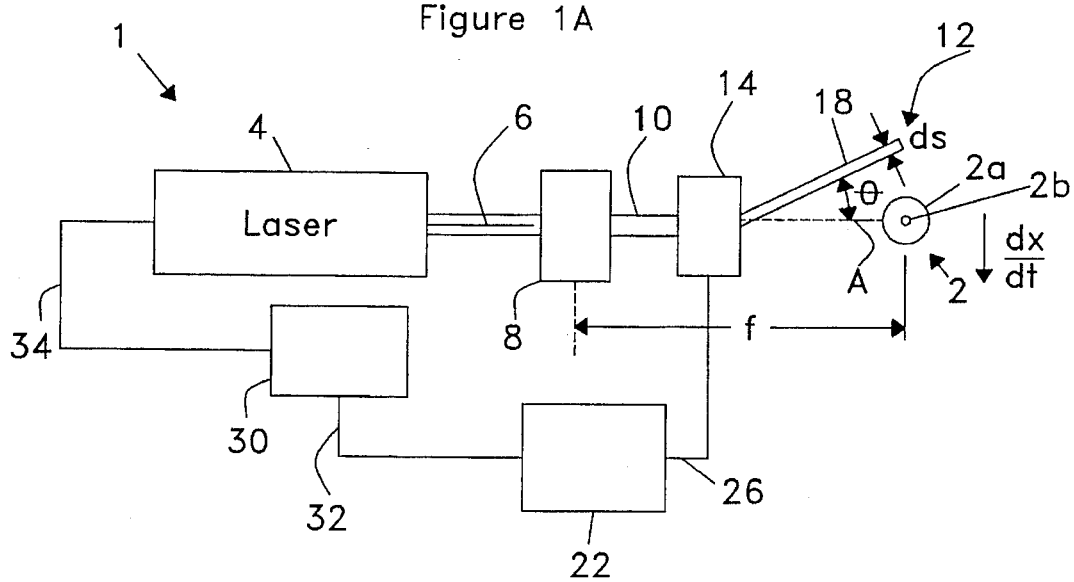
Figure 1C:
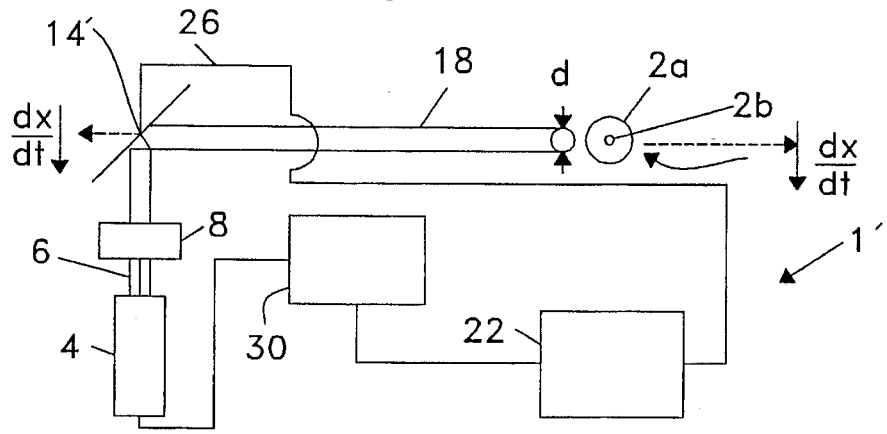
FIG. 1C shows a top view of a tap fabricating system 1' according to an alternative embodiment of the invention.

FIGS. 1A and 1B show a side and top view, respectively, of a tap fabricating system 1 according to one embodiment of the invention and FIG. 1C shows a top view of a tap fabricating system 1' for fabricating a tap 3 into a fiber 2 (multi-mode or single mode) having cladding 2a and core 2b using laser ablative chemical etching (LACE) process according to another embodiment of the invention. In particular, a laser 4 outputs a laser beam 6 which is focussed by a focussing system 8. Focussing system 8 can be a single converging lens having a focal length f or a plurality of lenses having a net or resultant focal length f. Focussing system 8 focusses laser beam 6 into a converging beam 10 which eventually converges into a laser spot 12 with a diameter $d_s$ (see FIG. 1B). Converging beam 10 is directed toward and passes through a scanner 14 as a scanning beam 18 toward fiber 2. Scanner 14 controls the angle $\Theta$ that scanning beam 18 forms with an imaginary line (dashed line A in FIG. 1B). Scan rate dx/dt is defined here to be the rate that spot 12 passes across fiber 2 when $\Theta$ is approximately zero.

A processor 22 is connected to scanner 14 by a cable 26 and controls the angular scanning rate $d(\theta)/dt$ and consequently the scan rate dx/dt defined above as the rate at which spot 12 passes across fiber 2 when $\theta$ is 0. Processor 22 is also connected to a pulse controller 30 via cable 32. Pulse controller 30 in turn is connected to laser 4 via cable 34. In addition, pulse controller 30 can be used to pulse laser 4 in accordance with a timing signal periodically output by processor 22, thereby producing a pulsed laser beam 6.

Fiber 2 makes an angle $\phi$ with converging beam 18 where $\phi$ ranges from over 0 to 90 degrees. Tap 3 is symmetric if $\phi$ is 90 degrees but becomes asymmetric as $\phi$ deviates farther from 90 degrees.

FIG. 1C shows tap fabricating system 1' according to another embodiment of the invention. Here, the same reference numerals are used for those components in system 1' which are the same as in system 1. As can be seen, scanner 14 has been replaced by a linear translation scanner 14'. Linear translation scanner 14' linearly shifts position x of spot 12 by linearly shifting converging beam 18 in response to commands from processor 22.

Laser 4 should be selected to output laser radiation at wavelengths which are absorbed by fiber 2 and in particular by fiber cladding 2a. Alternatively, laser 4 can be replaced by any other energy source such as particle beam sources (e.g., ion beam or electron beam sources) provided that spot size $d_s$ is sufficiently small and the power output by these sources sufficiently large to ablate fiber 2 in accordance with "Laser fabricated fiber optical taps for interconnects and optical data processing devices" by K. Imen et al. SPIE Vol. 1365 *Components for Fiber Optic Applications V,* pp. 60–64 (1990), and "Laser-fabricated fiber-optic taps", by K. Imen, et al. OPTICS LETTERS Vol. 15, No. 17, pp. 950–952, Sep. 1, 1990 the contents of which are incorporated herein by reference.

For standard silica based optical fibers, a $CO_2$ laser operating in a 9–11 micrometer range of wavelengths and typically at 10.6 micrometers can serve as laser 4. It should be noted however, that any energy source can be used to ablate fiber 2 provided that the energy source is absorbed by cladding 2a of fiber 2 and that the energy source can be focussed sufficiently tight (i.e., spot 12 is sufficiently small) that an energy threshold power $P_{th}$ is exceeded. Once $P_{th}$ is exceeded, each scan across fiber 2 increases the etch depth $d_{etch}$.

Figure 2A:
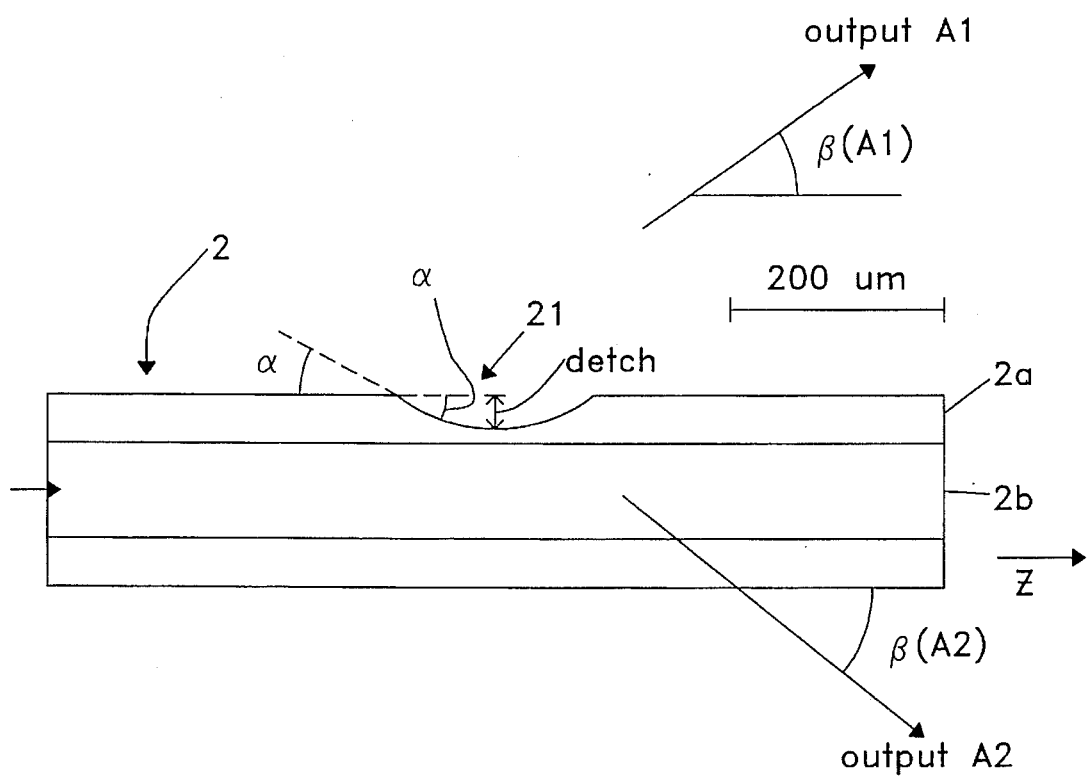
FIGS. 2A and 2B show two types of taps, a large Gaussian shaped tap and a small triangular shaped tap, respectively.
Figure 2B:
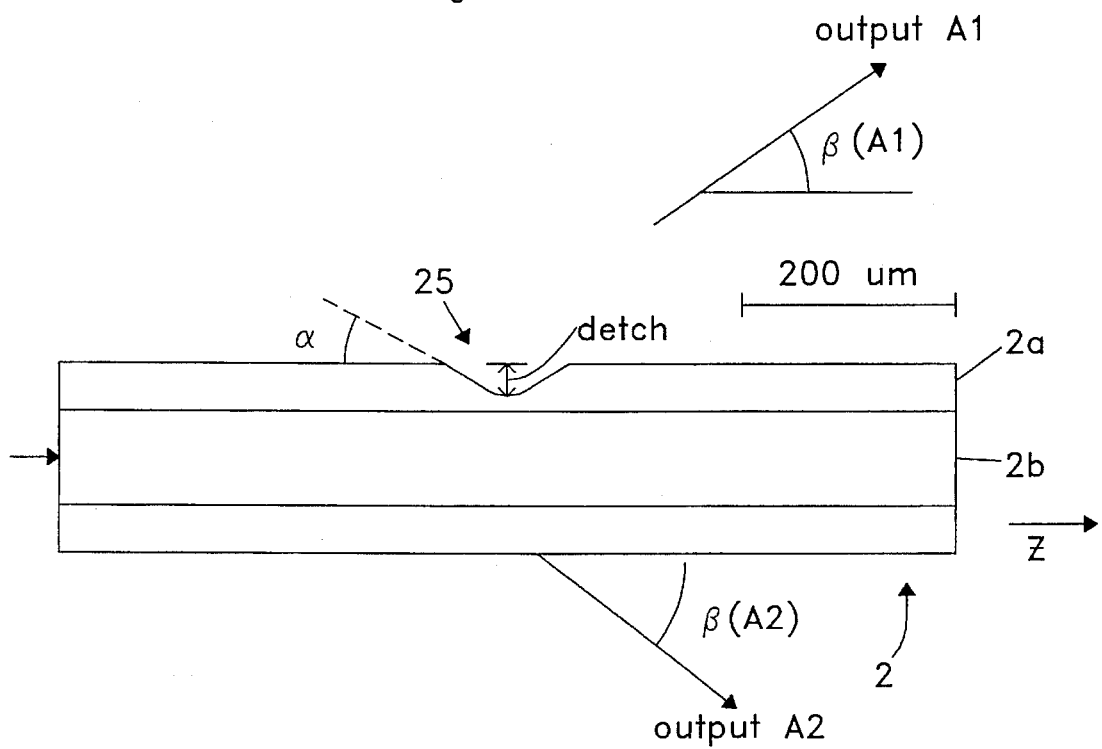

FIGS. 2A and 2B show two symmetric taps, a large Gaussian shaped tap 21 and a small triangular shaped tap 25, respectively, which can be fabricated into fiber 2 using tap fabricating system 1 or 1'. Since taps 21 and 25 are symmetric, they can be characterized by a single angle $\alpha$ as shown. Here $\alpha=10$ degrees for tap 21 in FIG. 2A and $\alpha=35$ degrees for tap 25 in FIG. 2B. Radiation from laser 4 travels left to right as shown. Large Gaussian shaped tap 21 couples radiation out of fiber 2 above tap 21 (output A1) at an angle $\beta(A1)$ with respect to fiber 2 and below tap 21 (output A2) at an angle $\beta(A2)$ with respect to fiber 2. Similarly, small triangular shaped tap 25 couples radiation out of fiber 2 above tap 25 (output A1) and below tap 25 (output A2).

Large Gaussian shaped tap 21 was fabricated using a 10 Watt, $CO_2$ laser and 40 laser scans at a scan rate dx/dt of 70 mm/s. Focussing system 8 produced a spot 12 with a diameter $d_s$ of 240 micrometers. The diameter of fiber cladding 2a in FIG. 2A is about 140 micrometers.

Small triangular shaped tap 25 was fabricated using a 1.8 Watt $CO_2$ laser and 8 laser scans at a scan rate dx/dt of 45 mm/s. Focussing system 8 produced a spot 12 with a diameter $d_s$ of 60 micrometers. The diameter of fiber cladding 2a in FIG. 2B is also about 140 micrometers.

Figure 2C:
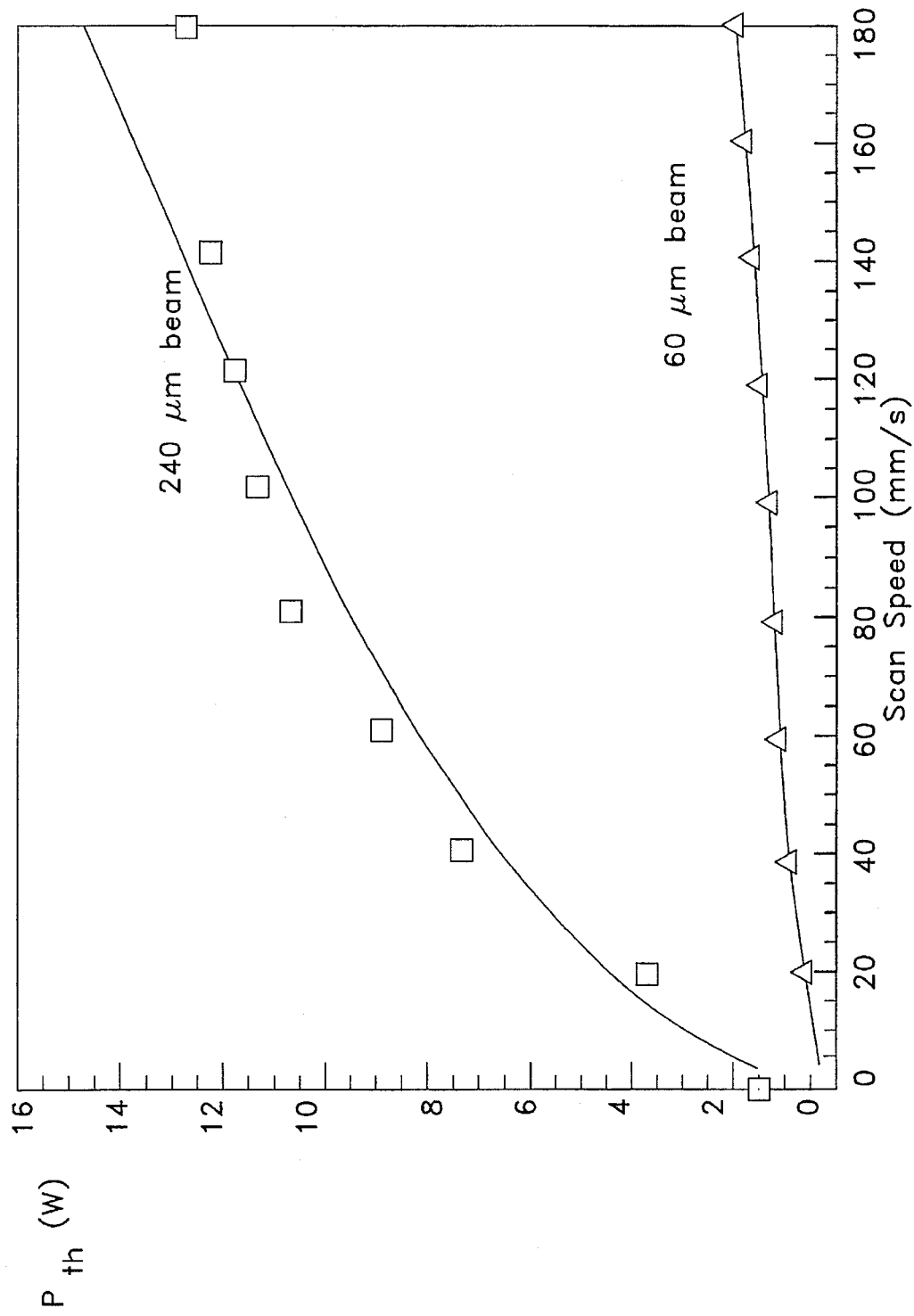
FIG. 2C shows a plot of laser power threshold versus scanning speed for a beam spots having diameters of 60 micrometers and 240 micrometers.

FIG. 2C shows a plot of laser power threshold $P_{th}$ in watts versus scanning speed for a beam spot of 60 micrometers and 240 micrometers. As mentioned above, once $P_{th}$ is exceeded, each scan across fiber 2 increases the etch depth $d_{etch}$.

Figure 2E:
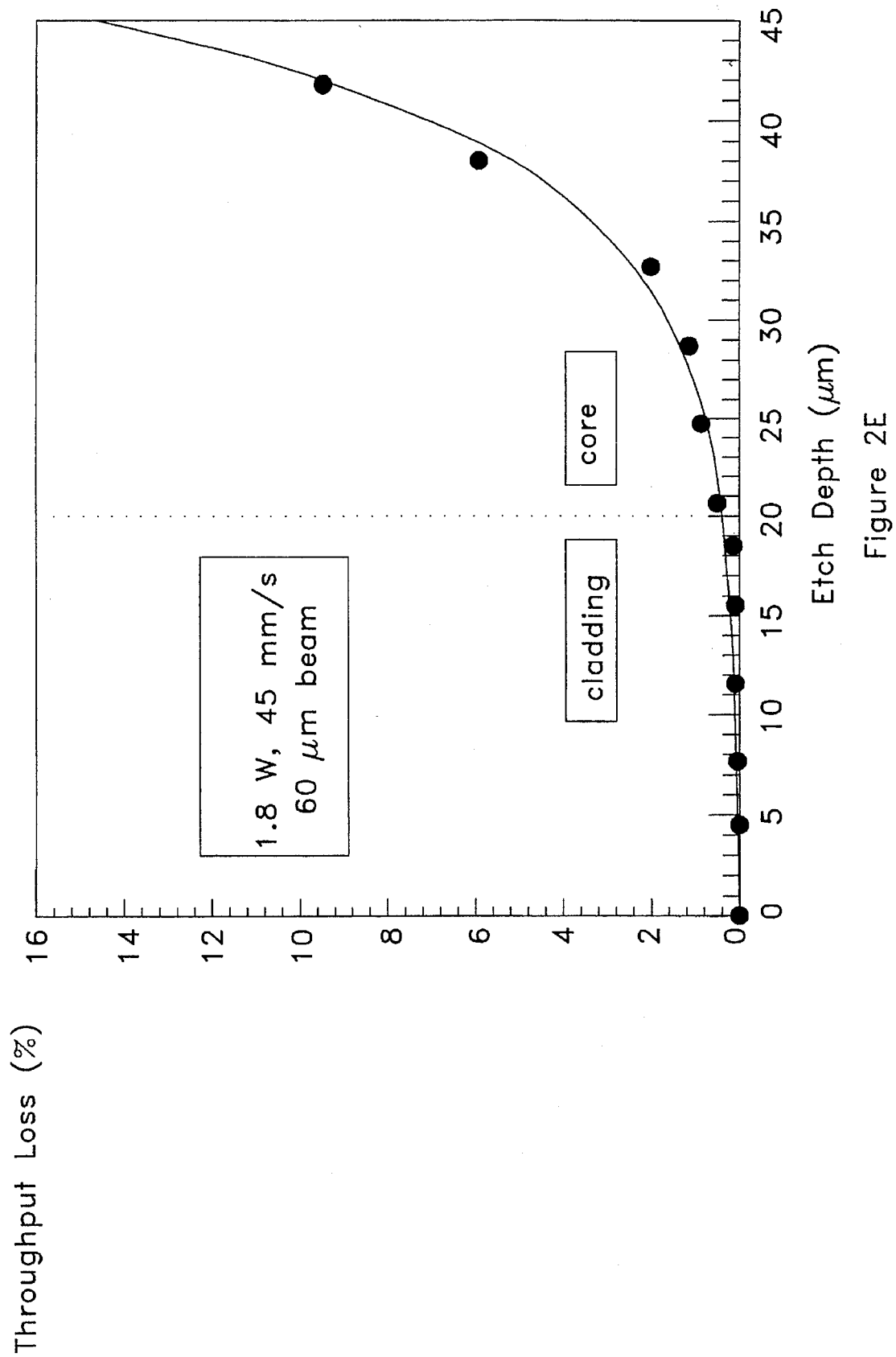
FIG. 2E shows a plot of power lost at the far tip of fiber 2 (which is the right tip in FIGS. 2A or 2B) versus etch depth $d_{etch}$.
Figure 2F:
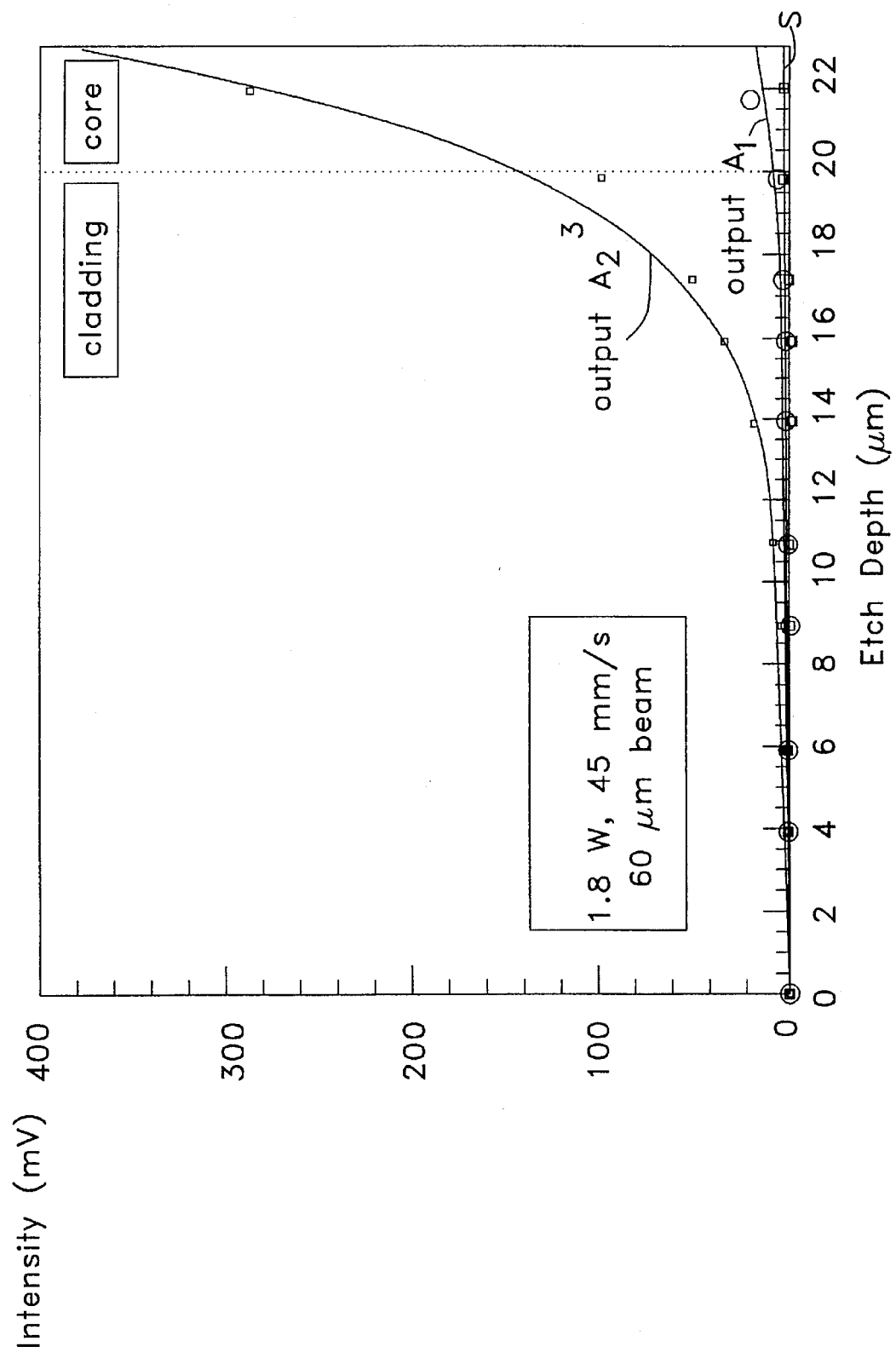
FIG. 2F shows power in output A1, A2 and scattered (non-localized output) S versus etch depth $d_{etch}$.

FIG. 2D shows etch depth $d_{etch}$ versus number of scans for a 1.8W $CO_2$ laser with scanning rate dx/dt=45 mm/s and the spot 12 has a 60 micrometer diameter. FIG. 2E shows a plot of power lost at the far tip (right tip in FIGS. 2A or 2B) versus etch depth $d_{etch}$. FIG. 2F shows power in output A1, A2 and scattered (non-localized output) S versus etch depth $d_{etch}$ for a 1.8W $CO_2$ laser with spot diameter $d_s=60$ micrometers, and scanning rate dx/dt=45 mm/s. Here, scattered output S corresponds to radiation output at the sides (not top or bottom) of fiber 2.

Figure 2G:
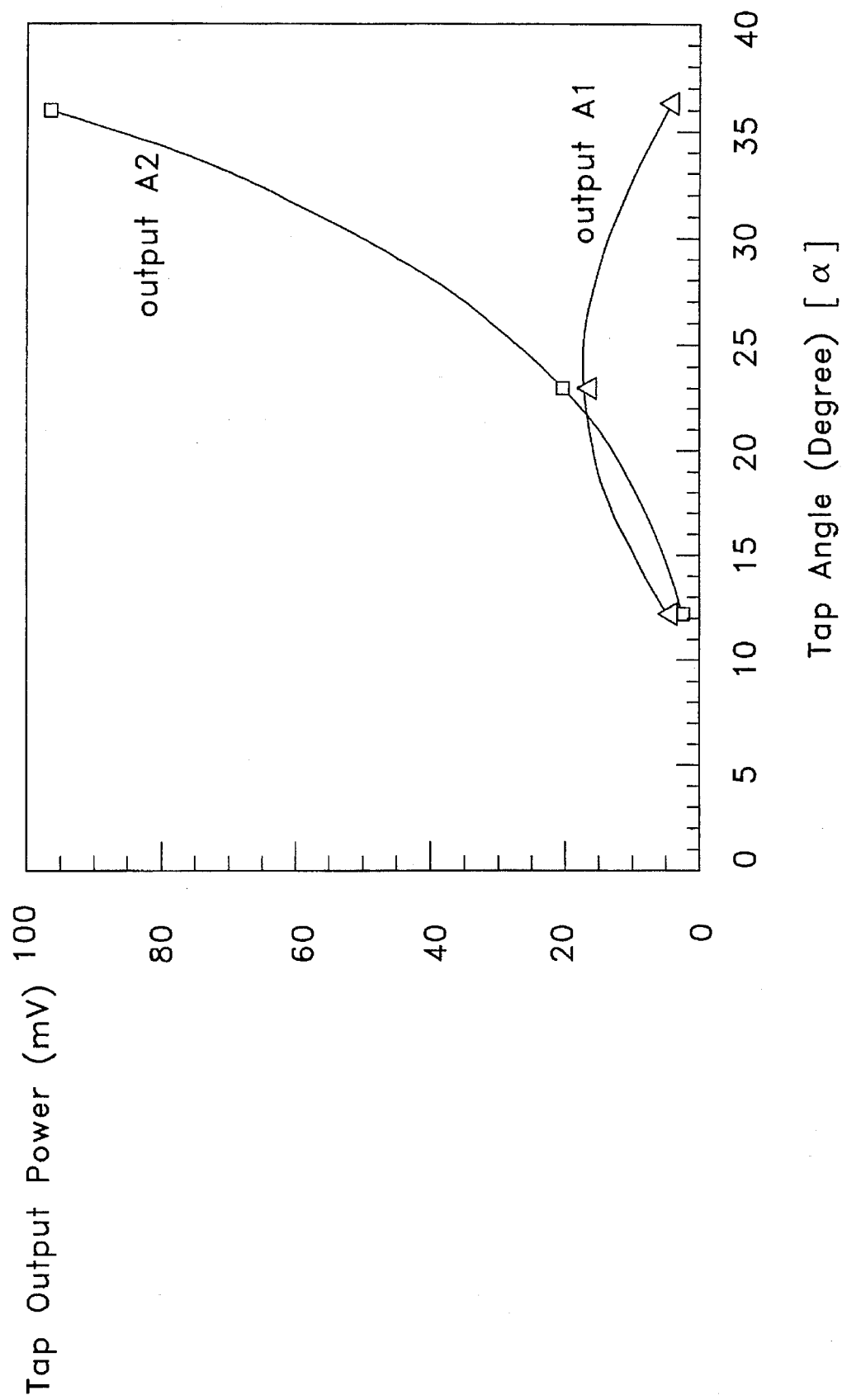
FIG. 2G shows power in outputs A1 and A2 as a function of angle $\alpha$.

It was found that varying tap angle $\alpha$, varies power in outputs A1 and A2. FIG. 2G shows power in outputs A1 and A2 as a function of angle $\alpha$. It was also found that varying tap angle $\alpha$, varies power in output angles $\beta(A1)$ and $\beta(A2)$.

Figure 2H:
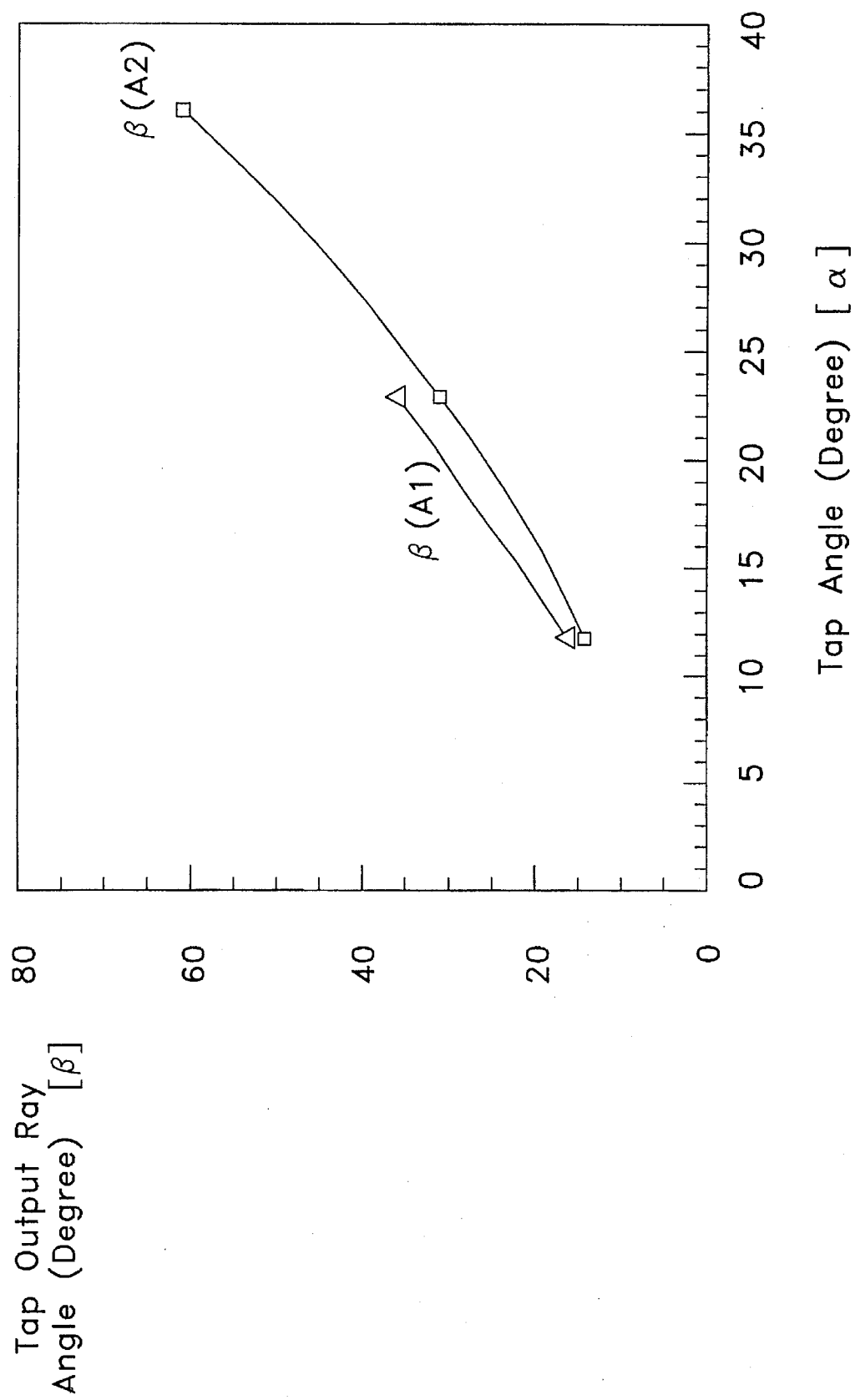
FIG. 2H shows output angles $\beta$(A1) and $\beta$(A2) as a function of tap angle $\alpha$.

FIG. 2H shows output angles β(A1) and β(A2) as a function of tap angle α for multimode fiber.

Figure 3A:
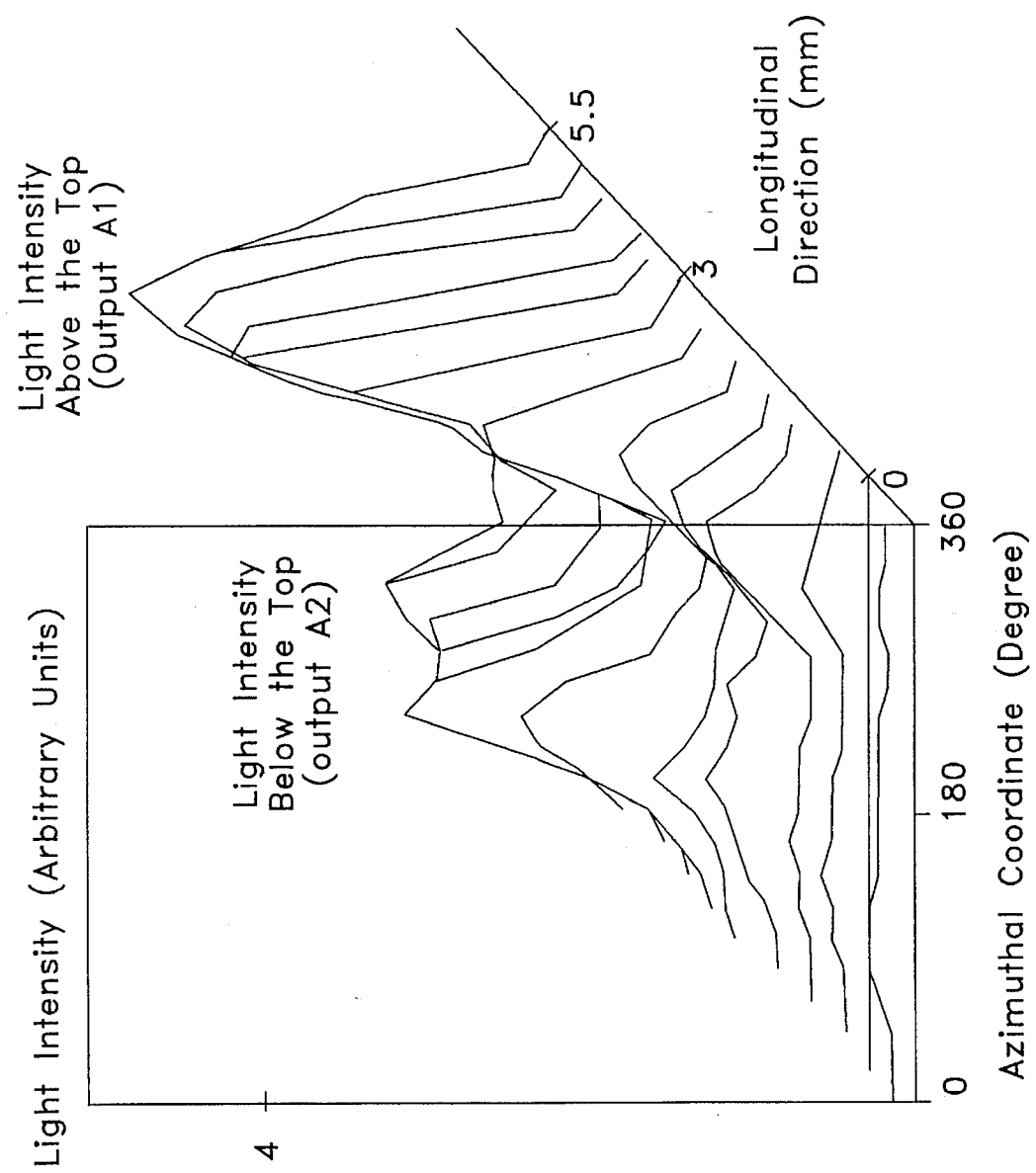
FIG. 3A is a three dimensional plot of intensity (arbitrary units) above and below a large Gaussian tap.

FIG. 3A is a three dimensional plot of intensity (arbitrary units) above large Gaussian tap 21 (output A1) and below tap 21 (output A2). As can be seen, tap 21 couples light out of fiber 2 above fiber 2 (output A1) as well as below fiber 2 (output A2) and consequently, tap 21 is a dual output tap.

Figure 3B:
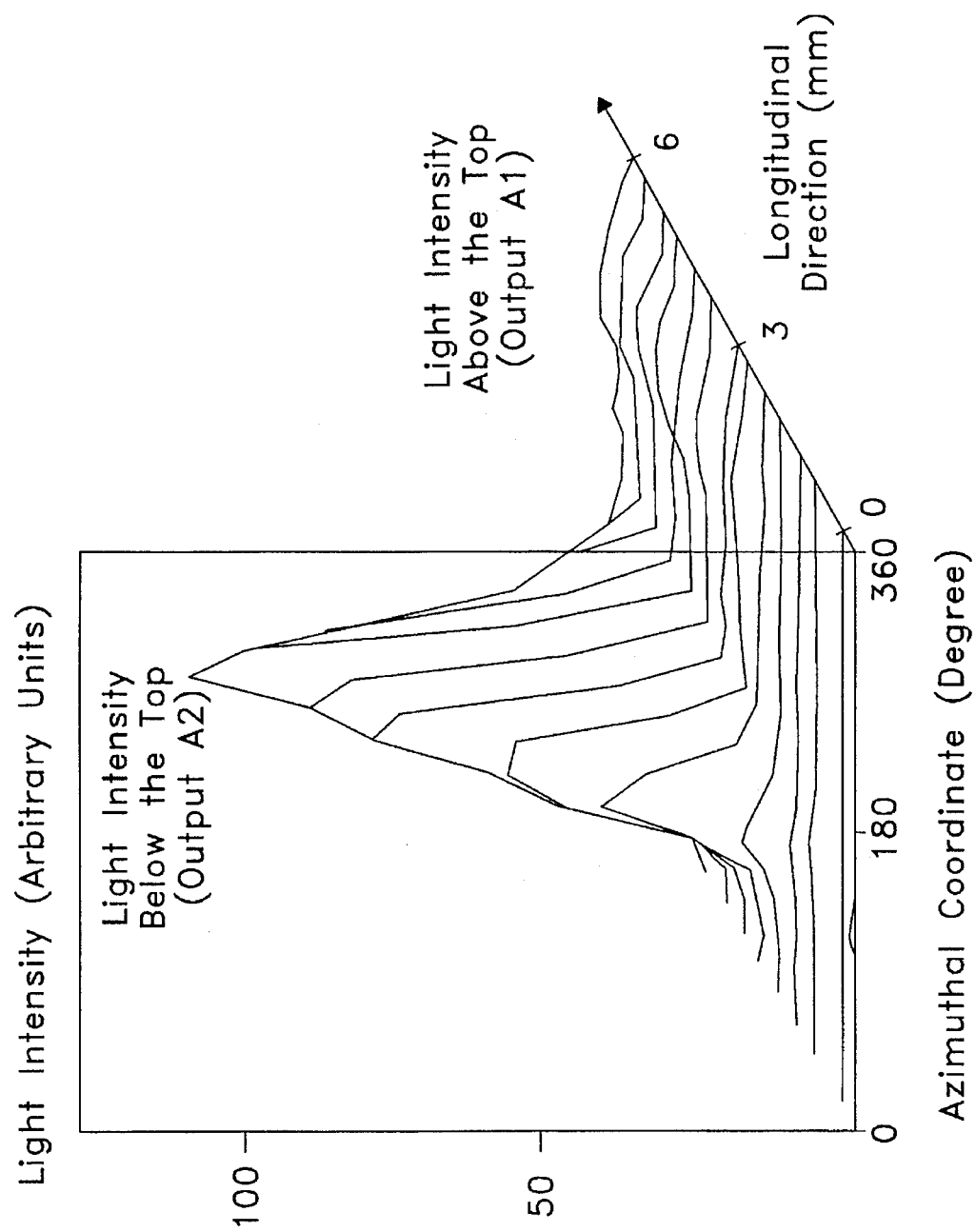
FIG. 3B is a three dimensional plot of intensity (arbitrary units) above and below a small triangular tap and FIGS. 3C, 3D and 3E show three dimensional plots of intensity (arbitrary units) above and below taps with $\alpha$ equal to 10, 23 and 35 degrees, respectively.

FIG. 3B is a three dimensional plot of intensity (arbitrary units) above small triangular tap 25 (output A1) and below tap 25 (output A2). As can be seen, tap 25 only couples light out of fiber 2 below fiber 2 (output A2) and consequently tap 25 is a single output tap.

Figure 3C:
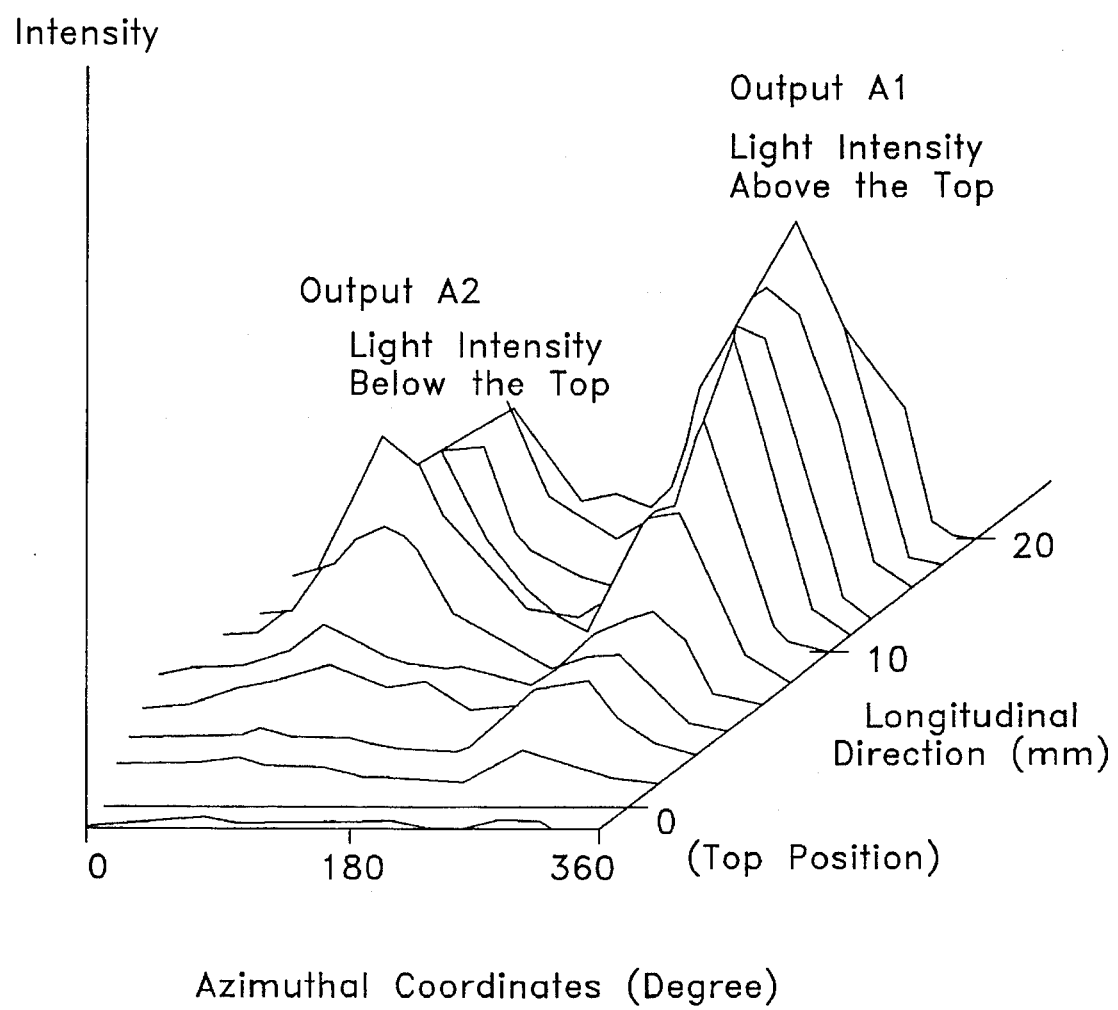
Figure 3D:
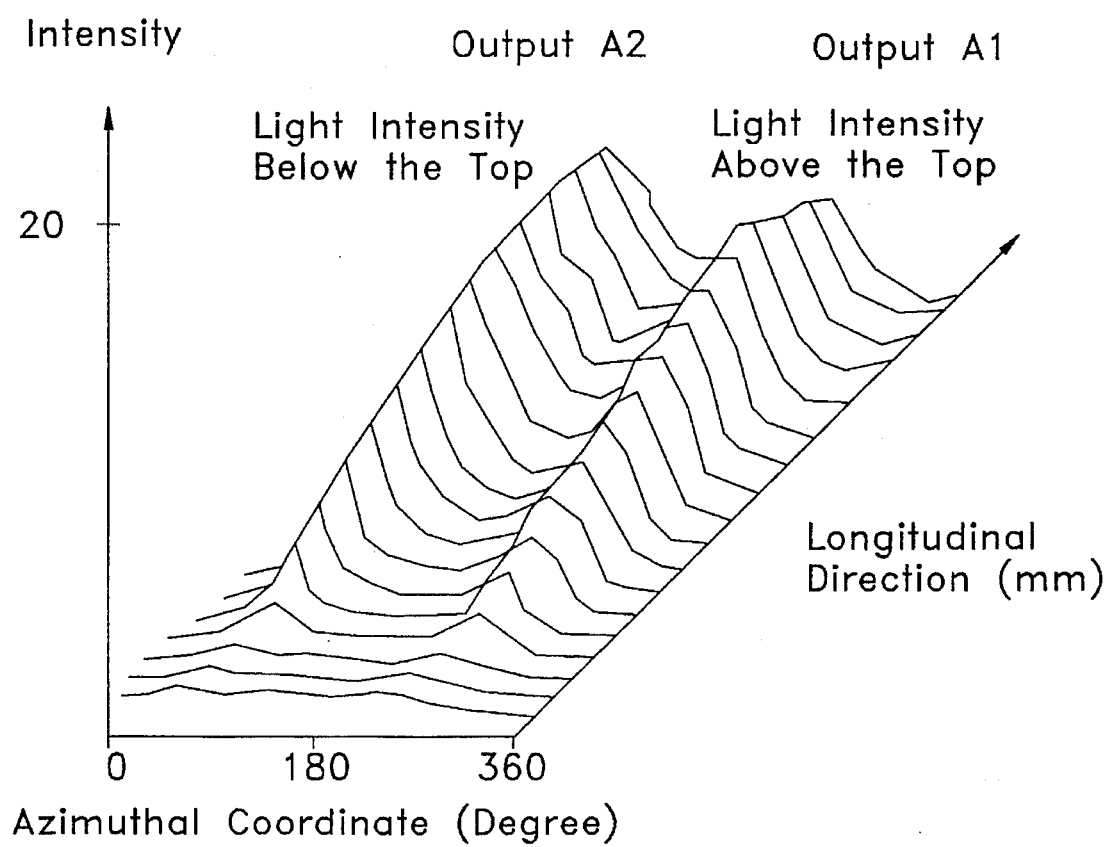
Figure 3E:
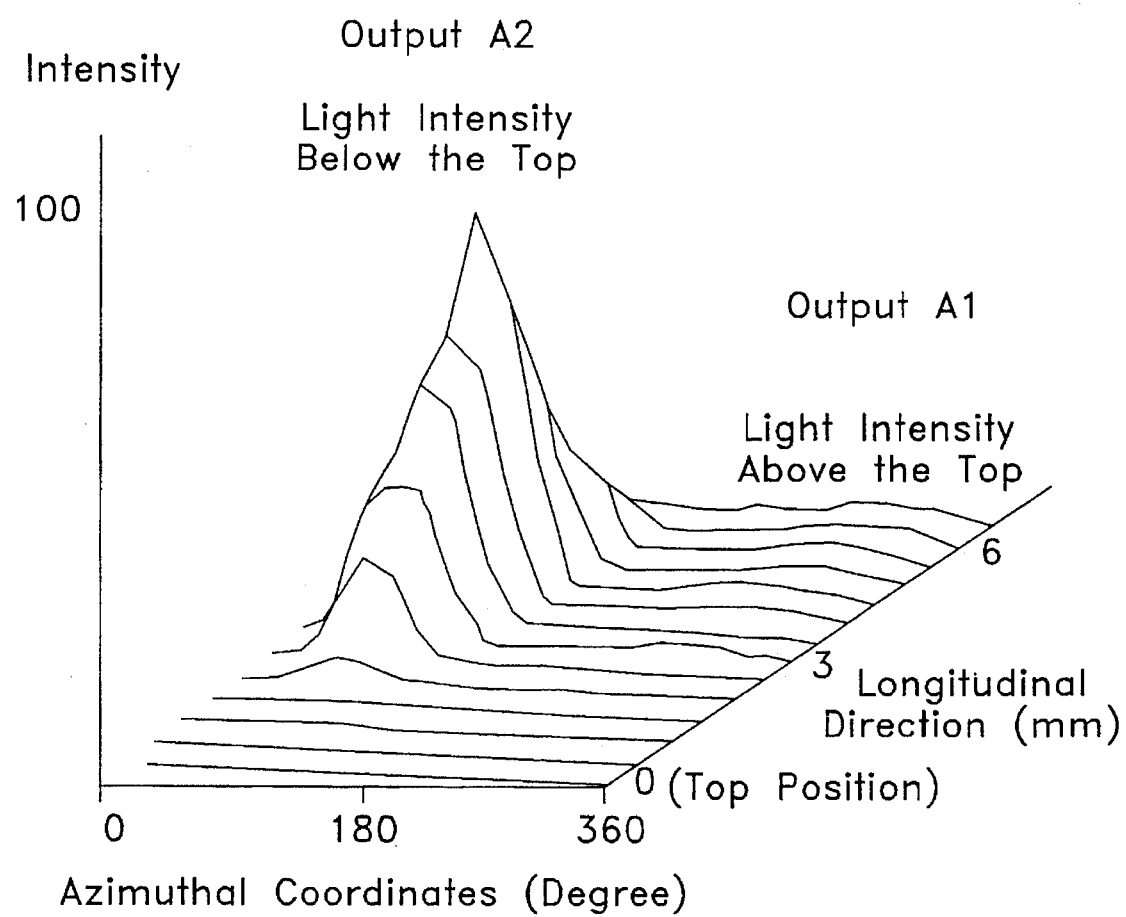

FIGS. 3C, 3D and 3E show three dimensional plots of intensity (arbitrary units) above and below taps with α equal to 10, 23 and 35 degrees, respectively.

Figure 4:
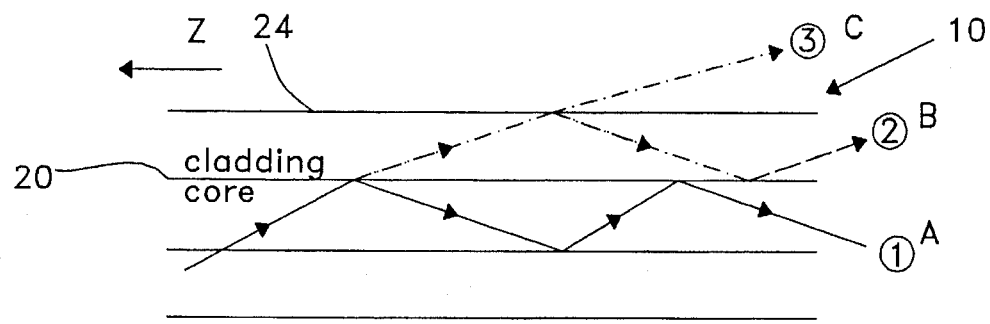
FIG. 4 shows three types of optical radiation modes which can occur when optical radiation is launched into an optical fiber.

FIG. 4 shows three types of optical radiation modes which can occur when optical radiation is launched into an optical fiber 10. In particular, FIG. 4 shows optical fiber 10 with a core 20 and a cladding 24. Optical radiation launched into optical fiber 10 can be transmitted via core modes (A) and cladding modes (B). A certain portion of core modes (A) and cladding modes (B) escapes as radiation modes (C). Moreover, it was found that the amount of loss of this radiation increases depending on the amount of misalignment or bending present upstream (direction z) which occurs for fiber 200. Such losses are typically spread over the entire length of fiber 10. In addition, radiation modes can be output in any transverse direction.

Figure 5:
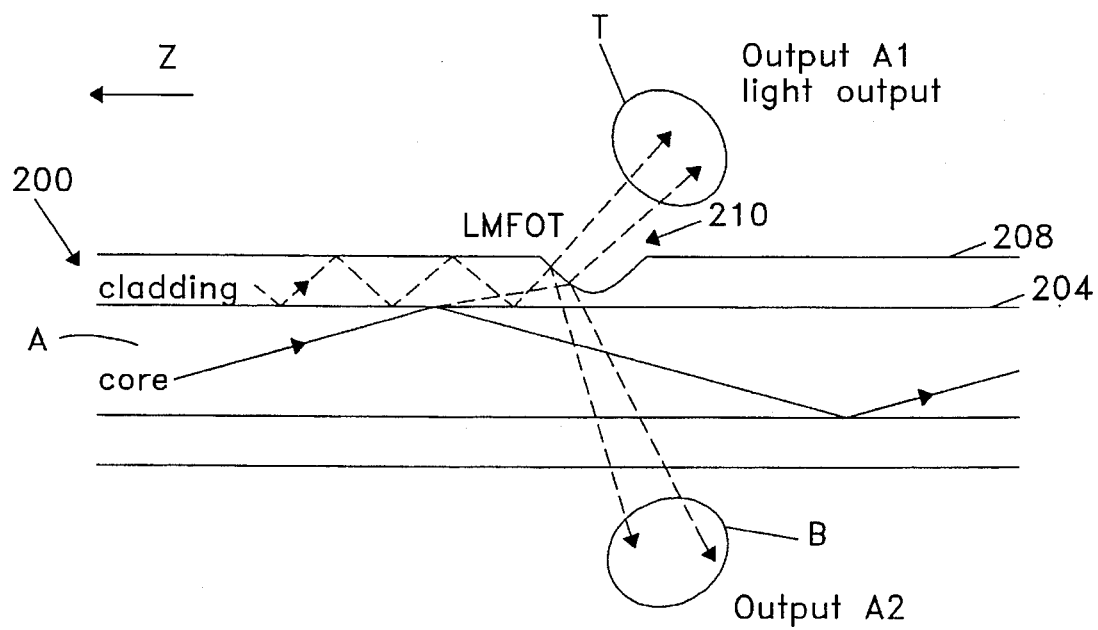
FIG. 5 shows an optical fiber with a laser micro-machined fiber optic tap (LMFOT) according to another embodiment of the invention.

FIG. 5 shows an optical fiber 200 having a core 204 and a cladding 208 with a laser micro-machined fiber optic tap (LMFOT) 210 according to another embodiment of the invention. LMFOT 210 was etched into cladding 208 using tap fabricating system 1'. As can be seen, LMFOT 210 has two outputs, output A1 and output A2. Both output A1 and output A2 are stronger and more localized than non-localized radiation C from FIG. 4. That is, both top and bottom outputs A1 and A2 are not uniformly distributed in all transverse directions. Instead, outputs A1 and A2 are concentrated in regions T and B, respectively. That is, outputs A1 and A2 are actually beams of radiation whose shape and orientation is determined by the geometry of LMFOT 210.

FIGS. 6A–6D show four different situations which can change the intensity at outputs A1 and A2 and consequently can also cause a loss in intensity of core modes A. FIGS. 6A, 6B and 6C show a lateral, axial and angular misalignment of fibers 300 and 200, respectively. Here a fiber 300 having a core 304 and a cladding 308 is demonstrated, it being understood that fiber 300 could be any optical device such as a laser, optical waveguide, etc. . . . In all three cases the intensity at output A1 and at output A2 is increased as the misalignment is increased. FIG. 6D shows fiber 200 under a strain or bending force. Again, the larger the strain the more radiation appears at outputs A1 and A2, respectively.

Figure 7:
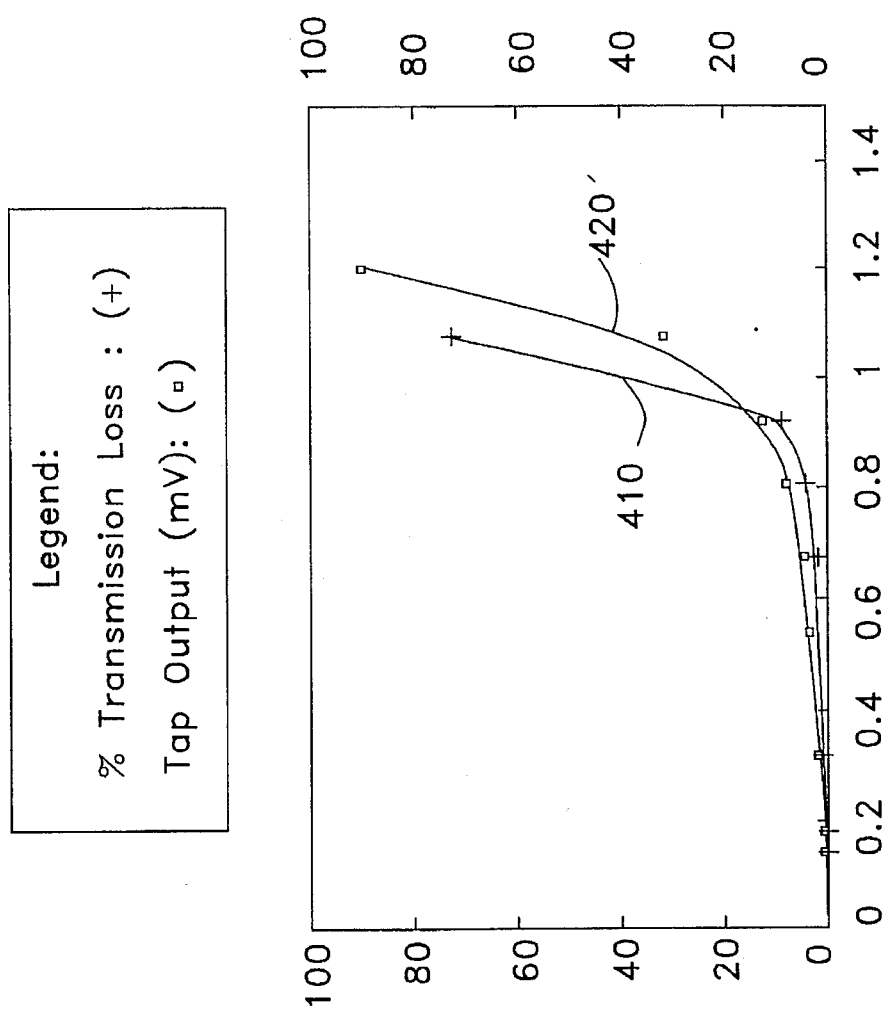
FIG. 7 shows a plot of the percentage of power lost due to lateral misalignments.

FIG. 7 shows a plot of the percentage of power lost due to lateral misalignment of a fiber 200 and a coupling lens simulating fiber 300, where lateral misalignment is defined as X/a, a is the diameter of core 204 and X is the lateral misalignment. The power at output A2 of LMFOT 210 is graph 410 of (+) in FIG. 7. The percentage of the power lost due to lateral misalignment of fibers 200 and 300, is graph 420 (dots) in FIG. 7. As can be seen, as X approaches a (the diameter of core 204 and 304) and consequently X/a approaches 1, the power output at output A2 of LMFOT 210 becomes large. It was also found that the power in output A2 was linearly proportional to power lost at the end of fiber 2.

Figure 8:
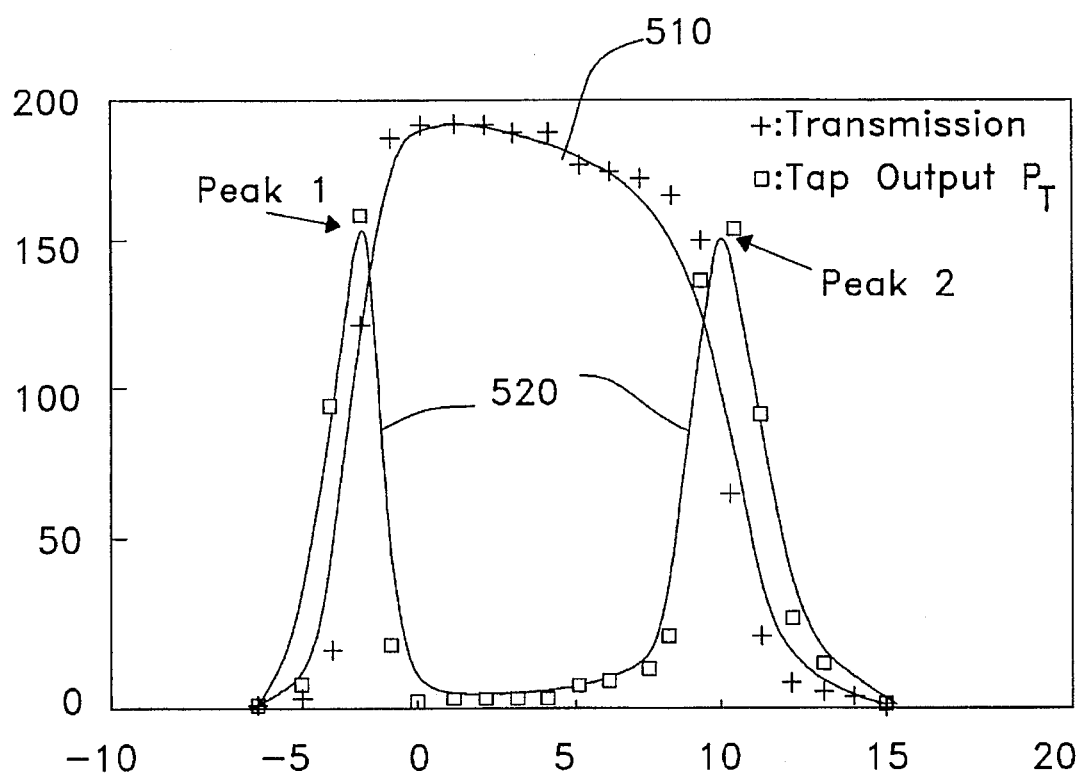
FIG. 8 shows a plot 510 of power $P_{out}$ output from fiber core 200a and another plot 520 of power $P_{A1}$ output from tap 210 due to lateral misalignment of fibers.

FIG. 8 shows a plot 510 of power $P_{out}$ output from fiber core 204 and another plot 520 of power in output A2 due to lateral misalignment of fiber 200 and some other optical device such as a lens. Again, the other device will be referred to as fiber 300, it being understood that fiber 300 is just one type of an optical component to be aligned with fiber 200. Here, lateral misalignment is actual lateral misalignment in units of 6.66 micrometers and power is proportional to a voltage in units of millivolts (as detected by a light detector). Also, negative lateral misalignments means that fiber 300 (simulated by a lens as discussed above) is below fiber 200. Consequently, a lateral misalignment of −5 means fiber 300 is 5×6.66=33.33 micrometers below fiber 200. As can be seen, output power $P_{out}$ has a maximum between two peaks, peak1 and peak2 of tap output power $P_T$.

As was the case with lateral displacement, an axial displacement and/or an angular displacement (see FIGS. 6B and 6C, respectively) also causes radiation to be coupled out of fiber 200 into outputs A1 and A2. Consequently, the power in output A1, output A2 or their sum $P_T$ (the total power output from tap 210), can be used to determine the integrity of couplings up stream from tap 210.

Figure 9A:
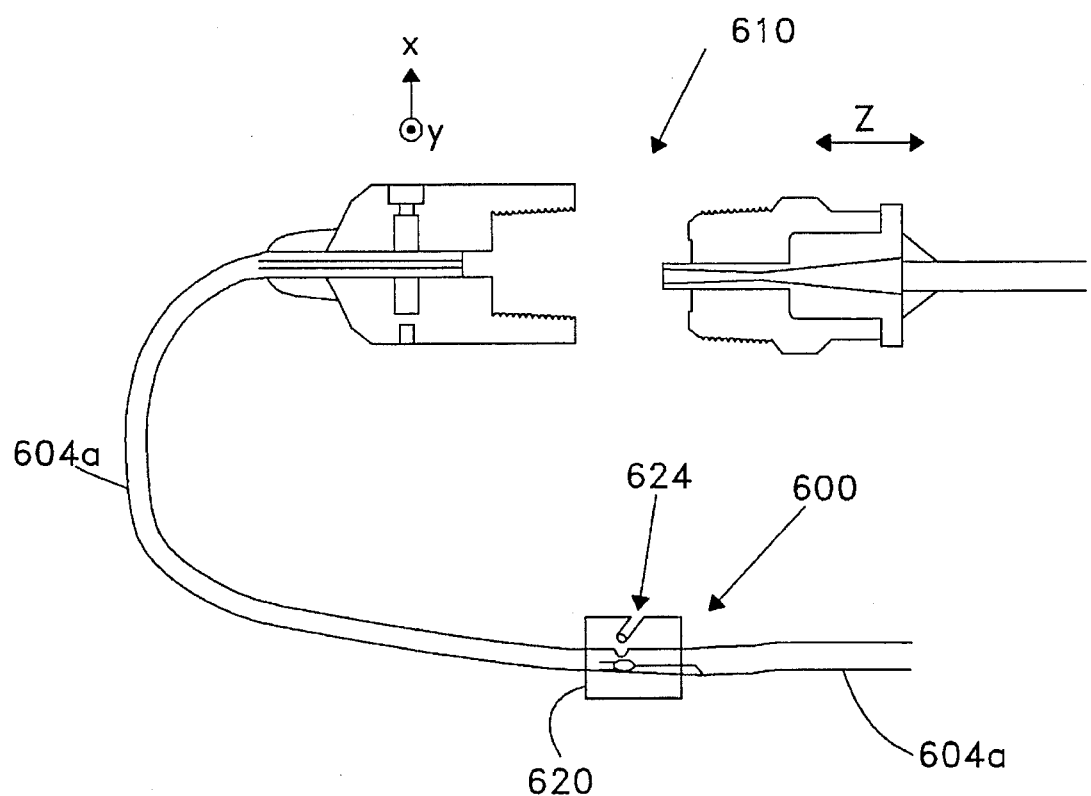
FIGS. 9A and 9B show a far and close view, respectively, of a fiber monitoring attachment on a fiber polymer jacket for monitoring the integrity of an optical coupler 610 according to another embodiment of the invention.
Figure 9B:
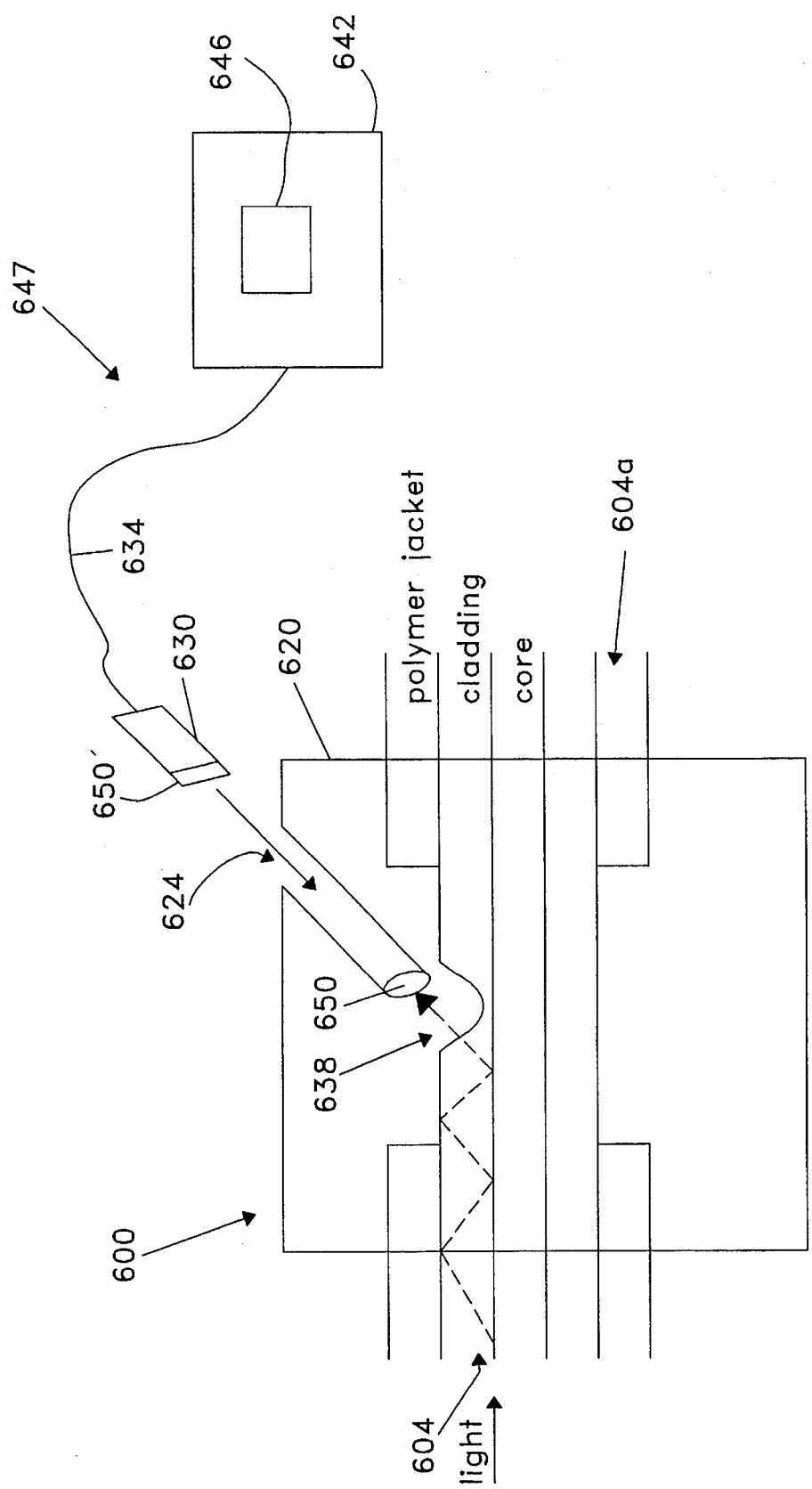

FIGS. 9A and 9B show a far and close view, respectively, of a fiber monitoring attachment 600 on a fiber polymer jacket 604a for monitoring the integrity of an optical coupler 610 according to another embodiment of the invention. Attachment 600 includes a mount 620 having a receptor 624 for receiving a portable power testing insert 630. A single fiber 604 (rather than two fibers with an optical connector) is on both sides of attachment 600 and is not divided or severed any way. Mount 620 of attachment 600 can be made of plastic and secured to polymer jacket 604a. Portable insert 630 is connected to a testing fiber 634 which guides the radiation output from tap 638 to a detector 642 which has a display 646 for displaying the power received by insert 630. Insert 630 with fiber 634 and detector 642 comprise a testing apparatus 647. Attachment 600 can have a lens 650 to help guide radiation output from tap 638 into insert 630. Alternatively, portable insert 630 itself can have a lens 650' which helps couple light into fiber 634.

Figure 10:
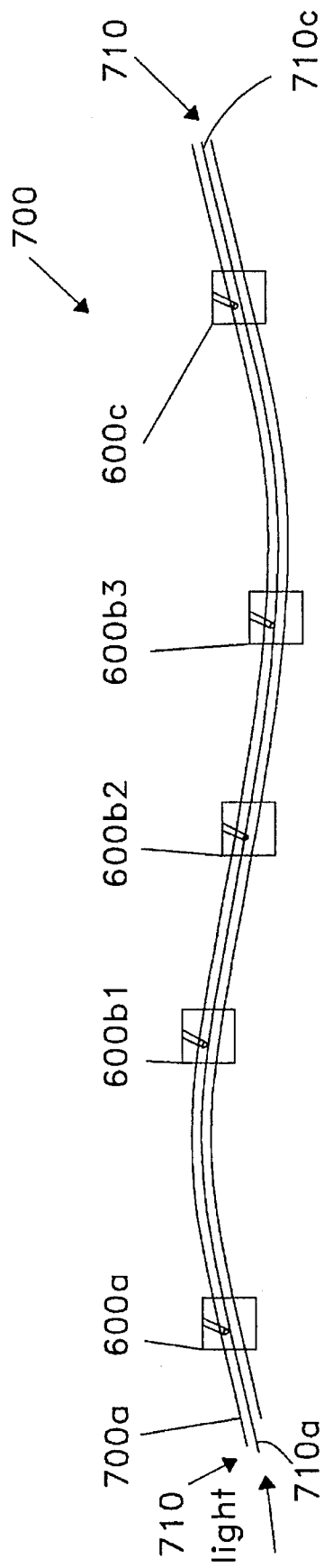
FIG. 10 shows an example of a tapped fiber having various fiber monitoring attachments.

FIG. 10 shows an example of a tapped fiber 700 having a polymer jacket 700a and fiber monitoring attachments 600a and 600c near ends 710a and 710c, respectively. Fiber 700 can also have attachments 600b1, 600b2 and 600b3 between attachments 600a and 600c. Here, light travels from left to right so attachment 600a is upstream from attachment 600b1, attachment 600b1 is upstream from attachment 600b2, etc, . . . . Since attachment 600a is near end 710a of optical fiber 700 (for example a few centimeters to a few meters from end 710a), it primarily monitors the integrity (e.g., occurrence of a misalignment) of a coupling at end 710a. The coupling at end 710a can be from another fiber (not shown) or from an optical source such as a laser (not shown). In either case, since attachment 600a is relatively close to fiber end 710a, it monitors the coupling of light into fiber end 710a.

Attachments 600a together with attachments 600b1–600b3 can be used to monitor bends and strains in fiber 700 itself. For example, if a worker using testing apparatus 647 detects no optical signal at 600a but detects an optical signal at attachment 600b1, that worker would know that fiber 700 must be strained or bent between attachments 600a and 600b1. Alternatively, if no signal is detected at attachments 600a or 600b1–600b3, but a signal is detected at attachment 600c, the worker would know that fiber 700 must be strained or bent between attachments 600b3 and 600c. Taps in attachments 600a, 600b1–600b3 and 600c can also serve to couple all higher order optical modes traveling in fiber 700.

Attachments 600*a*, 600*b*1–600*b*3 and 600*c* can be differentiated by shape, and or color or color coding. They can also have a cone shape or have an arrow which indicates direction of light flow.

Figure 11:
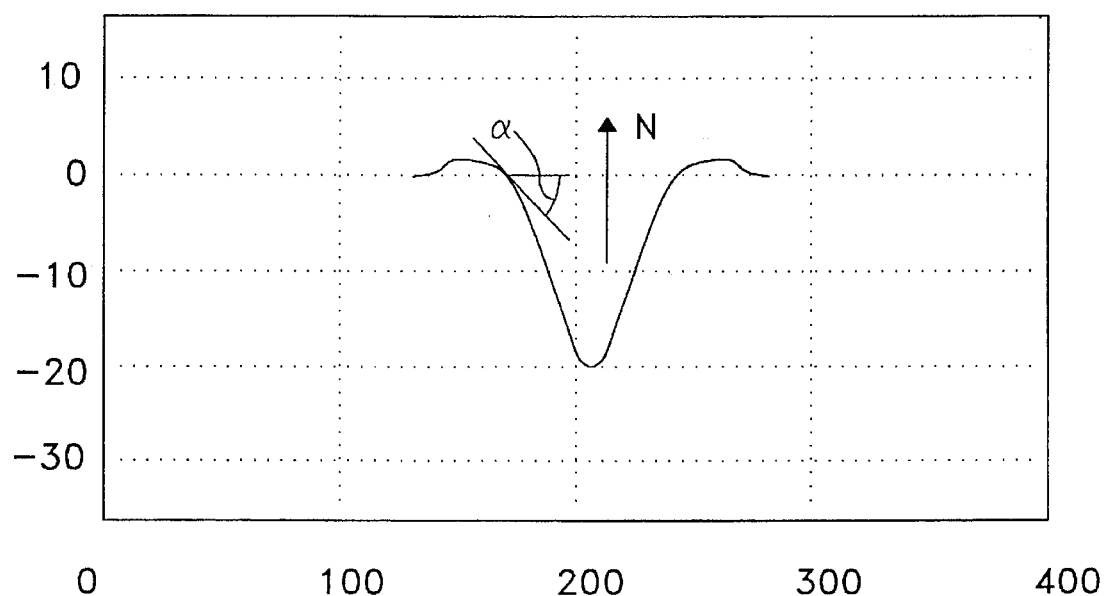
FIG. 11 shows a profile of a bi-directional optical fiber tap according to another embodiment of the invention.

FIG. 11 shows a profile of a bi-directional optical fiber tap 105 according to another embodiment of the invention. In particular, FIG. 11 shows a profile of a multi-mode optical fiber 101 having a cladding 103 with a diameter of 140 micrometer. Bi-directional tap 105 was produced using system 1 in FIG. 1A with laser 4 operating in a continuous mode at 1.8W and having a scan rate dx/dt of 45 ram/s.

Figure 12A:
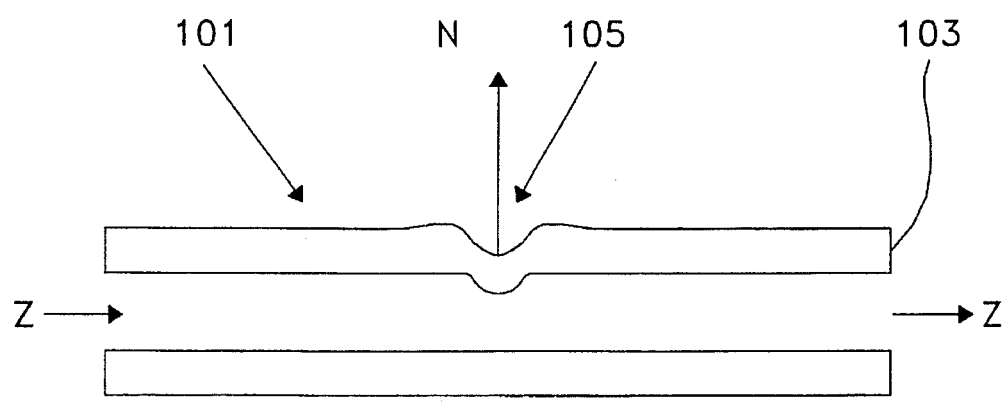
FIG. 12A and 12B shows an optical micrograph of a symmetric, bi-directional tap 105 and asymmetric tap 105', respectively.

FIG. 12A shows an optical micrograph of a symmetric and consequently bi-directional tap 105. As can be seen, bi-directional tap 105 has an approximately Gaussian profile and consequently is symmetric to an imaginary line N which is perpendicular to the longitudinal axis z of fiber 101.

Figure 12B:
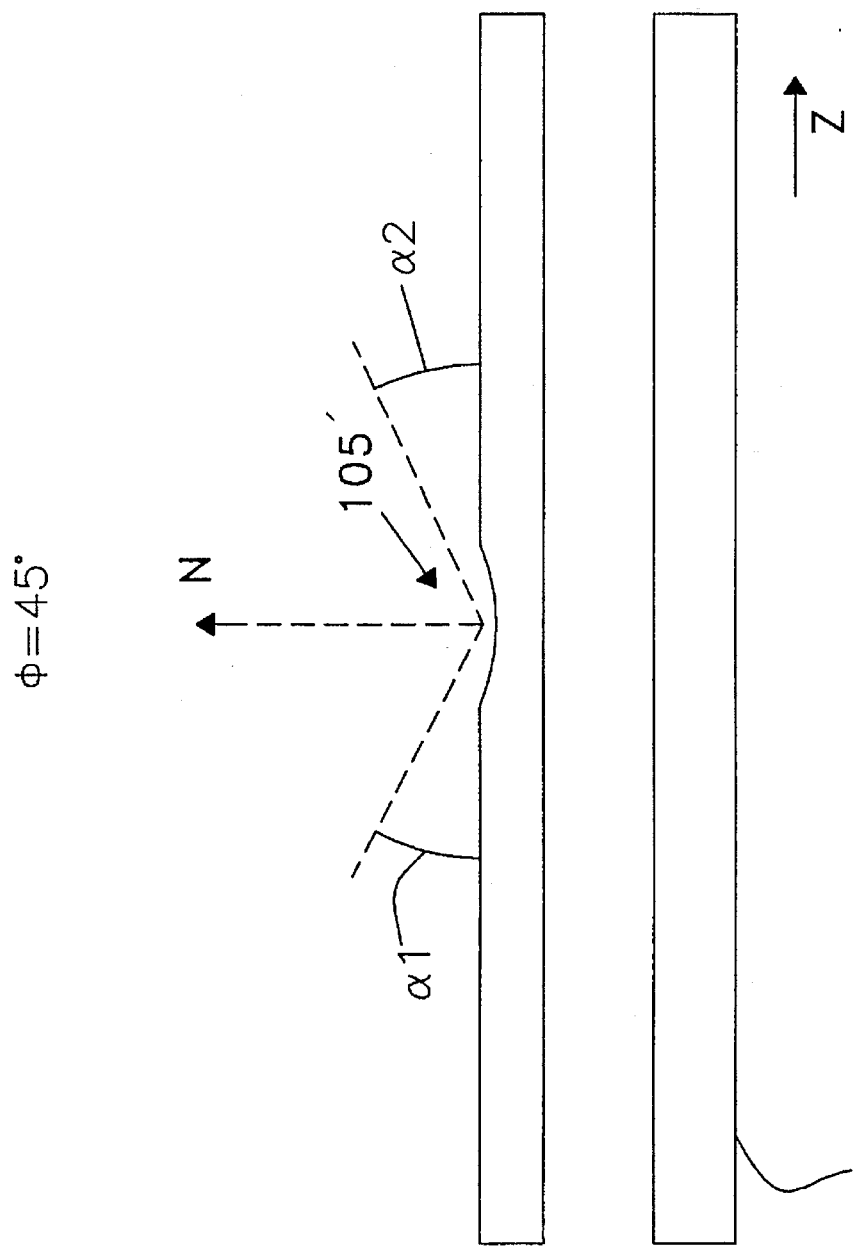

FIG. 12B shows a profile of an optical micrograph of an asymmetric tap 105' fabricated using φ=45 degrees (see FIG. 1A). As can be seen, tap 105' is asymmetric to imaginary line N which is perpendicular to the longitudinal axis z of fiber 101.

Figure 13:
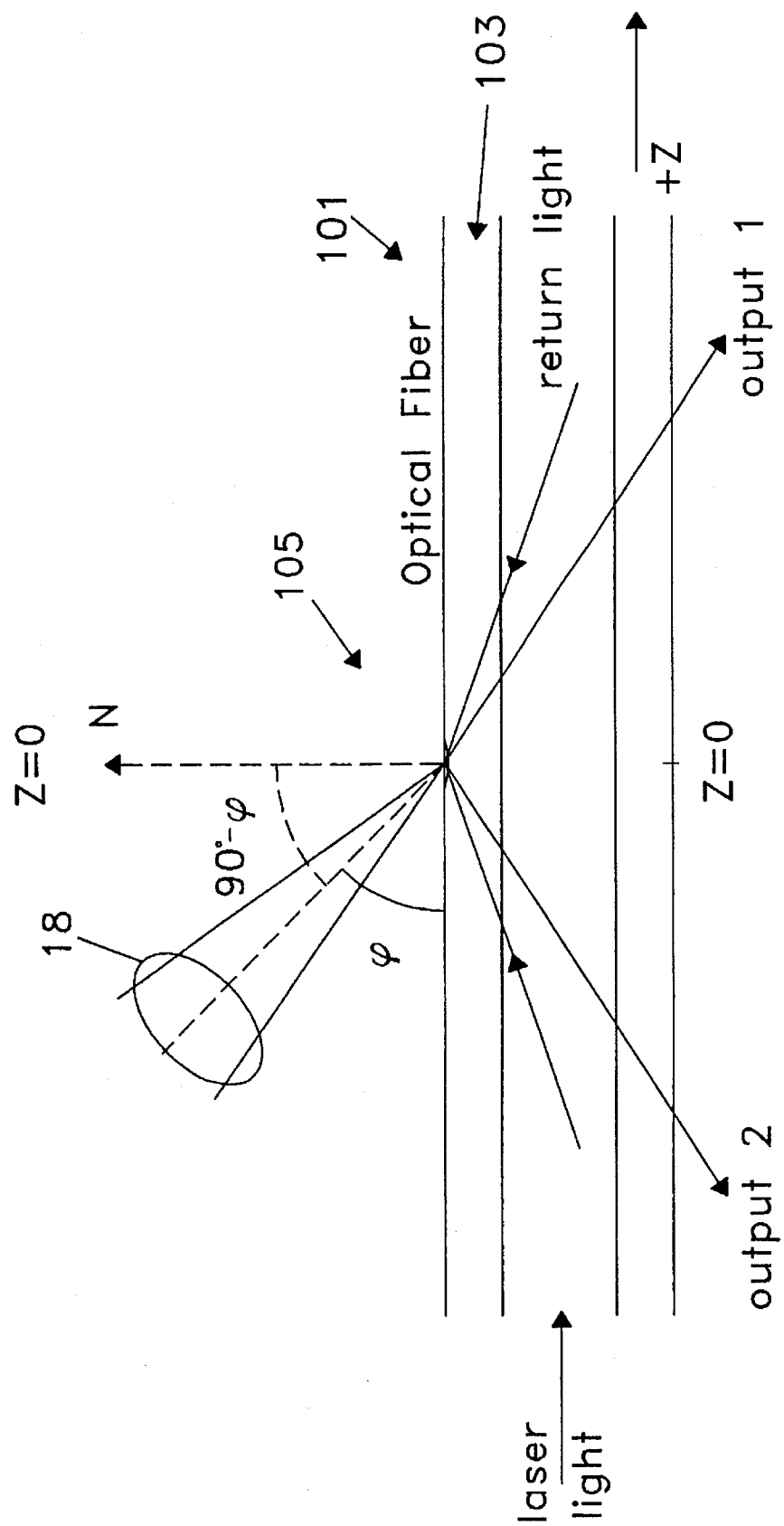
FIG. 13 shows the orientation for fabricating an asymmetrical tap.

FIG. 13 shows a tap 105 with laser light traveling along the z direction. Tap 105 outputs laser radiation in two directions corresponding to output 1 and output 2 provided φ is 45 degrees.

Figure 14:
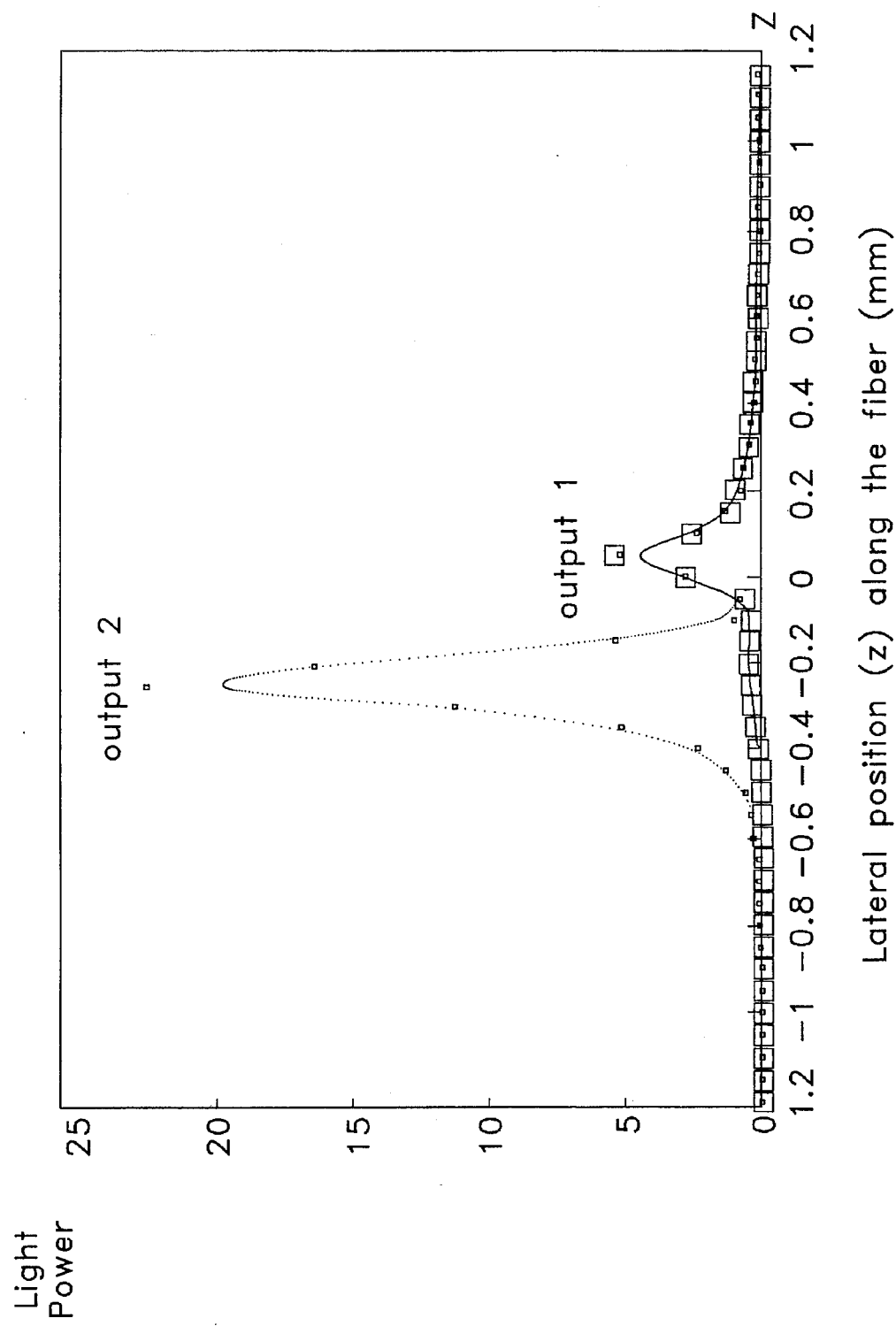
FIG. 14 shows actual radiation power (in units of mV as detected by a detector) at output 1 and output 2 from bi-directional tap in FIG. 11.

FIG. 14 shows actual radiation power (in units of mV as detected by a detector) at output 1 and output 2 from bi-directional tap 105 in FIG. 11. In particular, FIG. 14 shows intensity at outputs 1 and 2 with (large boxes) and without (small solid boxes) index matching material (not shown) at an end (down stream) of fiber 101. When index matching material is present at the down stream end of fiber 101, essentially no optical radiation is reflected back in the negative z direction. As can be seen, in this situation the intensity at output 2 is essentially zero. On the other hand, if no index matching material is used at the down stream end of fiber 101, the air-core interface that end makes with its surrounding atmosphere causes radiation to reflect back up fiber 101 in the -z direction. A portion of this reflected radiation was then coupled out of fiber 101 at output 2 due to bi-directional fiber optic tap 105. This shows that radiation which appeared at output 2 was radiation coupled out of fiber 101 which was traveling upstream (-z direction). Hence, since the magnitude of output 2 changes as the difference between the index of refraction of the core and the surrounding medium, output 2 can be used to sense the difference between the index of refraction of the optical core and the surrounding medium.

Figure 15:
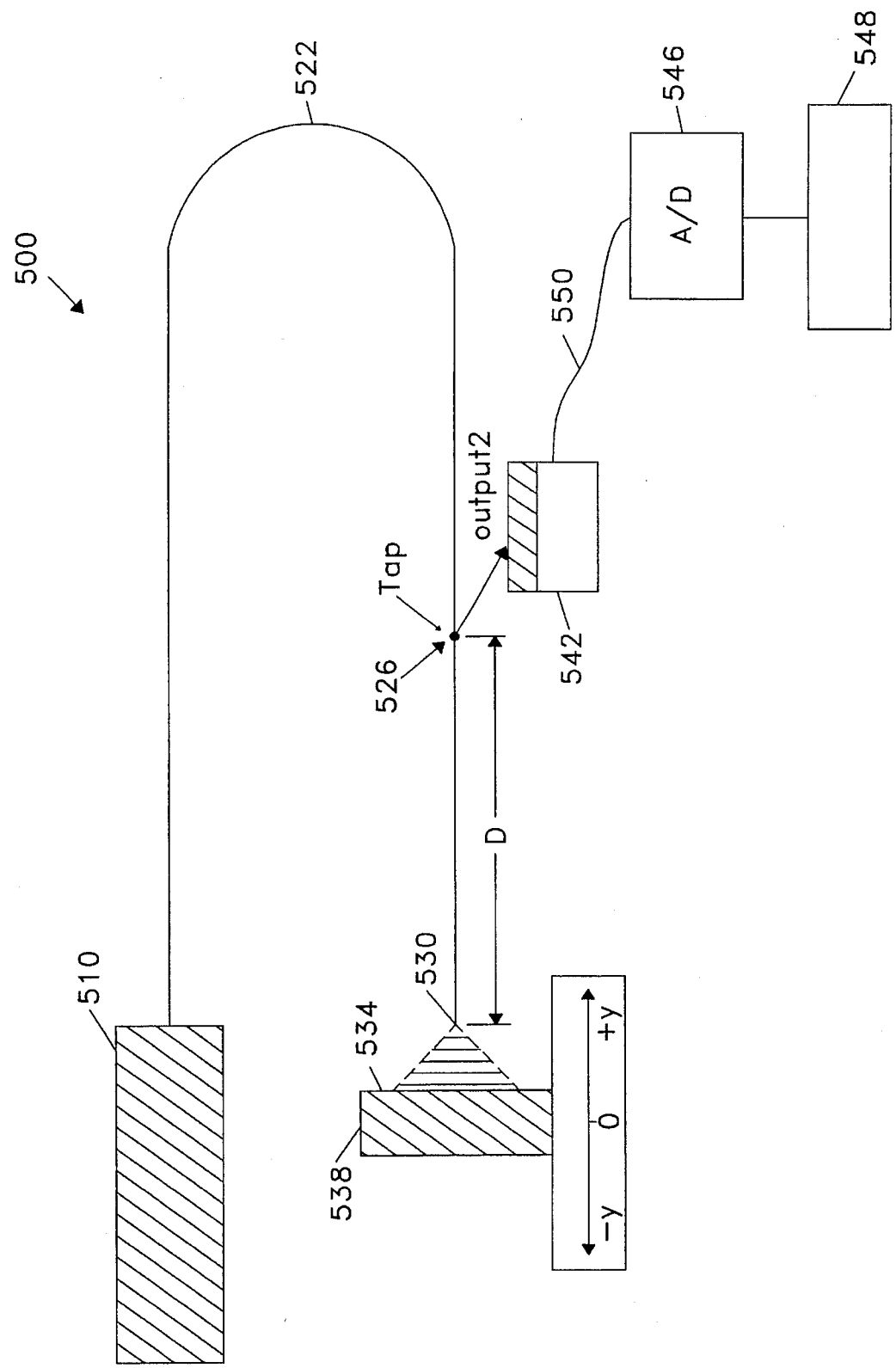
FIG. 15 shows how the above observation can be used in a sensing system according to another embodiment of the invention.

FIG. 15 shows how the above observation can be used to make a sensing system 500 according to another embodiment of the invention. In particular, FIG. 15 shows a laser 510 coupled to a tapped fiber 522. Tapped fiber 522 has bi-directional optical tap 526 located a distance D from fiber end 530 of tapped fiber 522. D can range from less than a centimeter to over several meters. Fiber tip 530 outputs optical radiation from laser 510 toward a surface 534 of a target 538 whose distance d from fiber tip 530 is to be determined.

A detector 542 located near bi-directional tap 526 measures the intensity of radiation in output 2 (recall FIGS. 13 and 14). Detector 542 outputs an analog signal on wire 550, whose voltage is proportional to the intensity of light at output 2 of tap 526. This analog output signal can be used directly or it can be analog-to-digital (A/D) converted to a digital output signal using an A/D converter 546. A/D converter 546 can then send the digital output signal to a processor 548 to be used to calculate other parameters or to be displayed. Modulating laser 510 increases the signal to noise ratio of the signal output by detector 542. Also, fluctuations in output power of laser 10 cancel out if the ratio of output 2 and output 1 is determined.

Figure 16A:
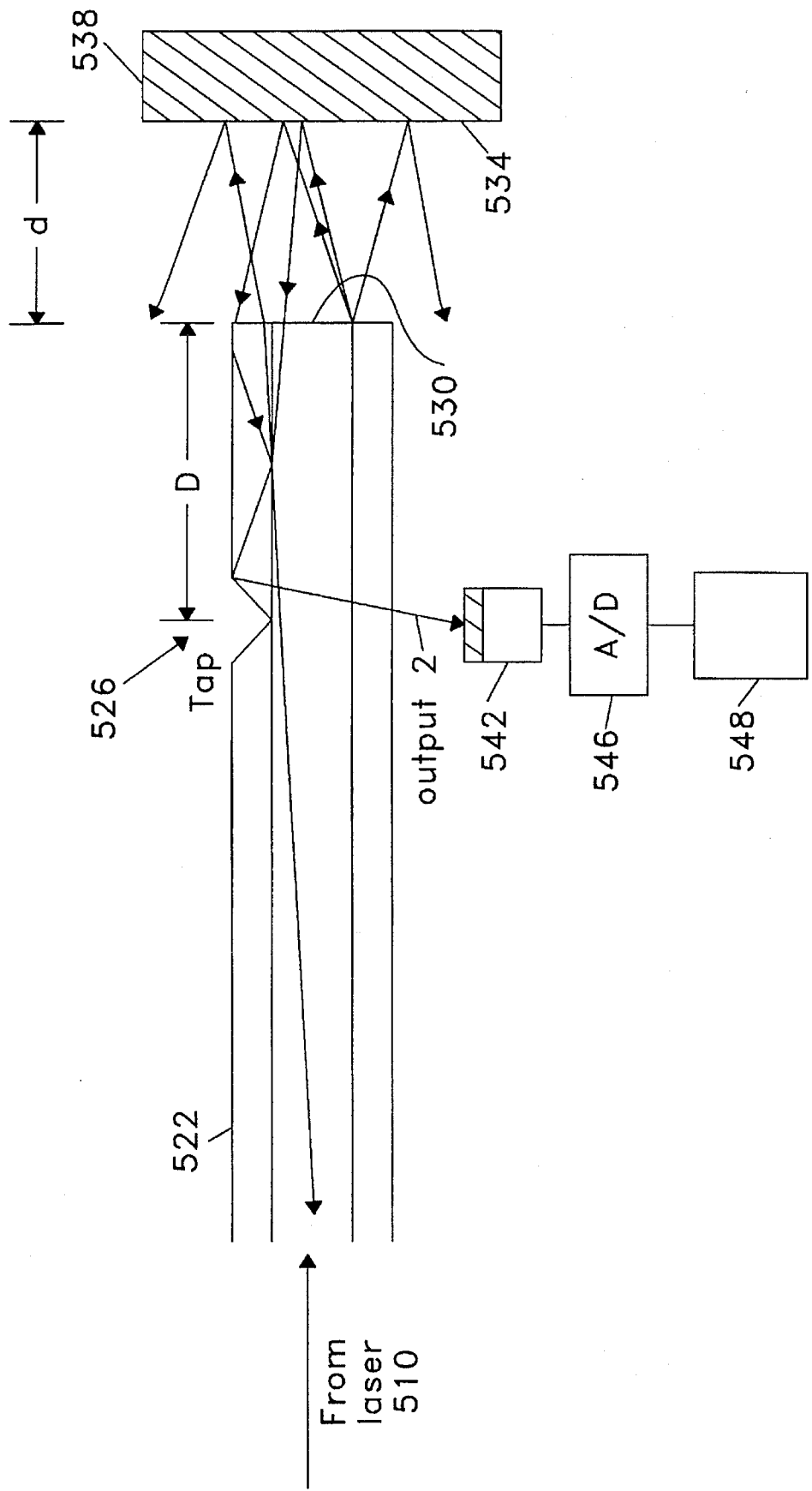
FIG. 16A shows an enlarged view at a fiber tip of a fiber in the sensing system of FIG. 15.

FIG. 16A shows an enlarged view at fiber tip 530 of fiber 522 a sensing system 520. Target surface 534 can be rough or smooth and preferably a retro-reflective surface such as retro-reflective paint or one or more (such as an array of) corner cubes. Target 538 can be a separate piece secured to an object whose position is to be determined. Alternatively, target 538 can be the object itself in which case surface 534 can be modified e.g., painted with retro-reflective paint, or covered with a material which is highly reflective at the wavelength of laser 510. Note that since the position of target 538 is fixed, sensing system 520 can be used as a surface measuring system.

Figure 16B:
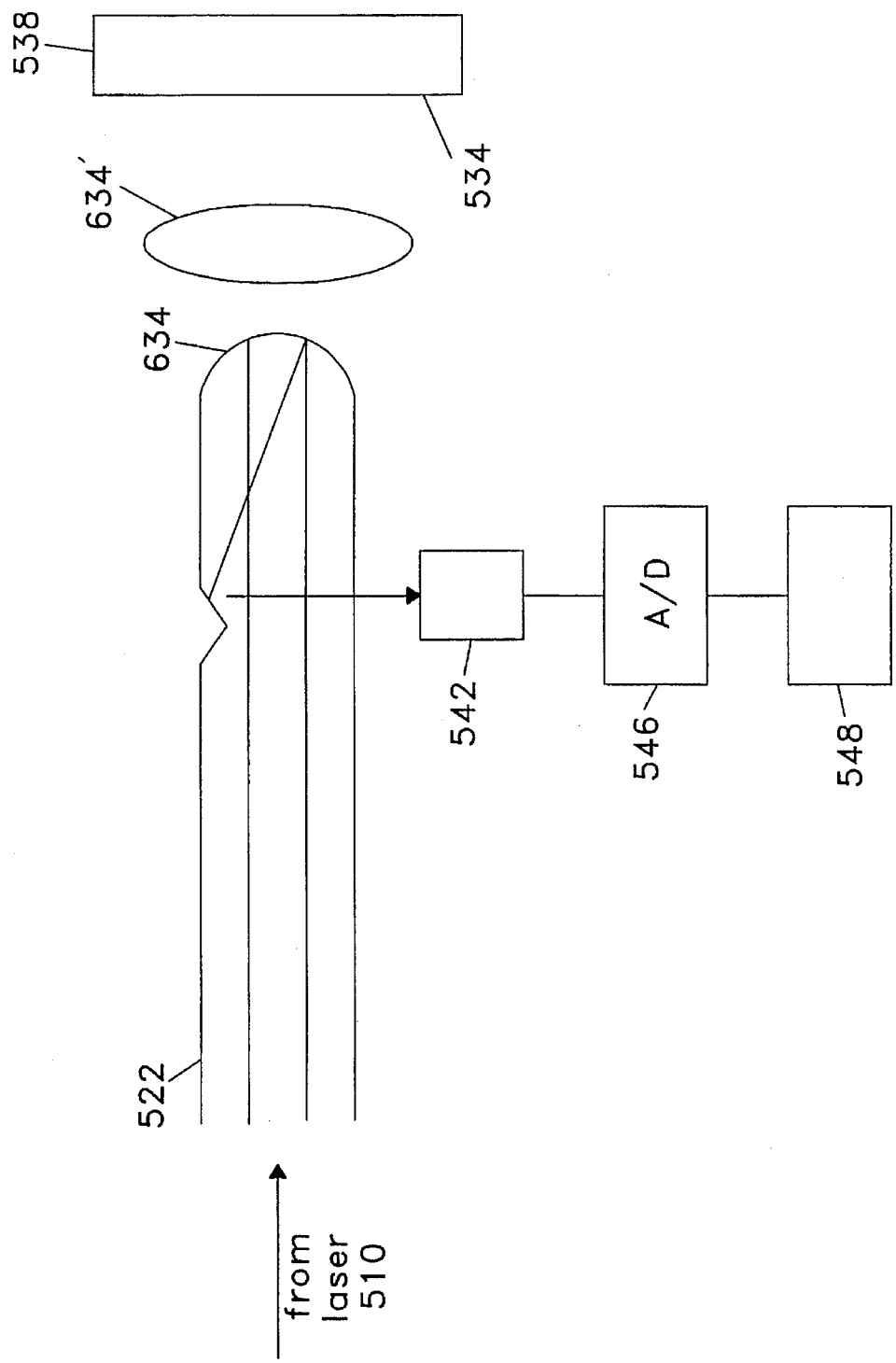
FIG. 16B shows an enlarged view of an alternative fiber tip.

FIG. 16B shows an enlarged view of fiber 522 according to an alternative embodiment of the invention. Here fiber tip 530 is replaced by a semi-spherical fiber lens 634. Alternatively or additionally, a separate lens 634' can be arranged between fiber tip 530 and surface 534. These approaches would increase the amount of light scattered off of surface 534 which is collected and transmitted back through fiber 522. Laser 510 can be modulated to increase signal-to-noise of position or refractive index measurements.

Figure 17:
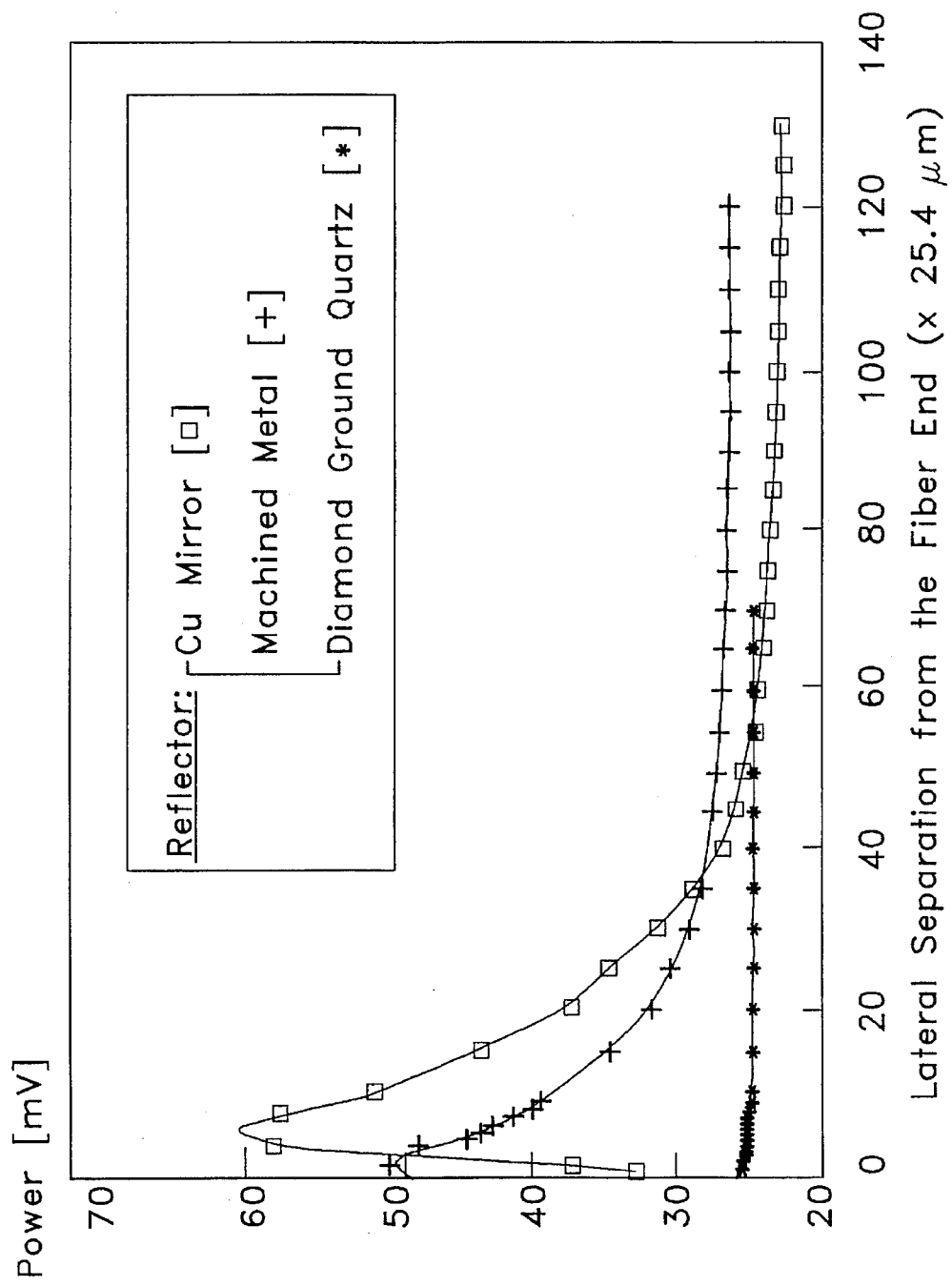
FIG. 17 shows a plot of a digital output signal in the sensing system of FIG. 15 using three different target surfaces versus distance d for a position sensing system 500 with the fiber tip in FIG. 16A.

FIG. 17 shows a plot of the digital output signal using three different surfaces 534 versus distance d for a position sensing system 500 with fiber tip 530 in FIG. 16A. In particular, FIG. 17 shows the voltage in millivolts, where laser 510 was a Helium Neon (HeNe) laser, distance D was 50 cm, tapped fiber 522 was multimode fiber with a core diameter of 100 micrometers fiber tip 530 had a numerical aperture (NA) of 0.29 and surface 534 was copper (solid box), machined metal (+) and diamond ground quartz (*). The digital output signal was found to be linearly proportional to the distance d with an accuracy of a few micrometers as d varied from a few micrometers to over a 100 micrometers. Smooth and highly reflective target surfaces 534 seem to provide the longest linear range and the highest accuracies. The range of distances d can be improved if surface 534 is retro-reflective type material and/or if fiber tip 534 is replaced with fiber lens 634 and/or lens 634'.

Figure 18:
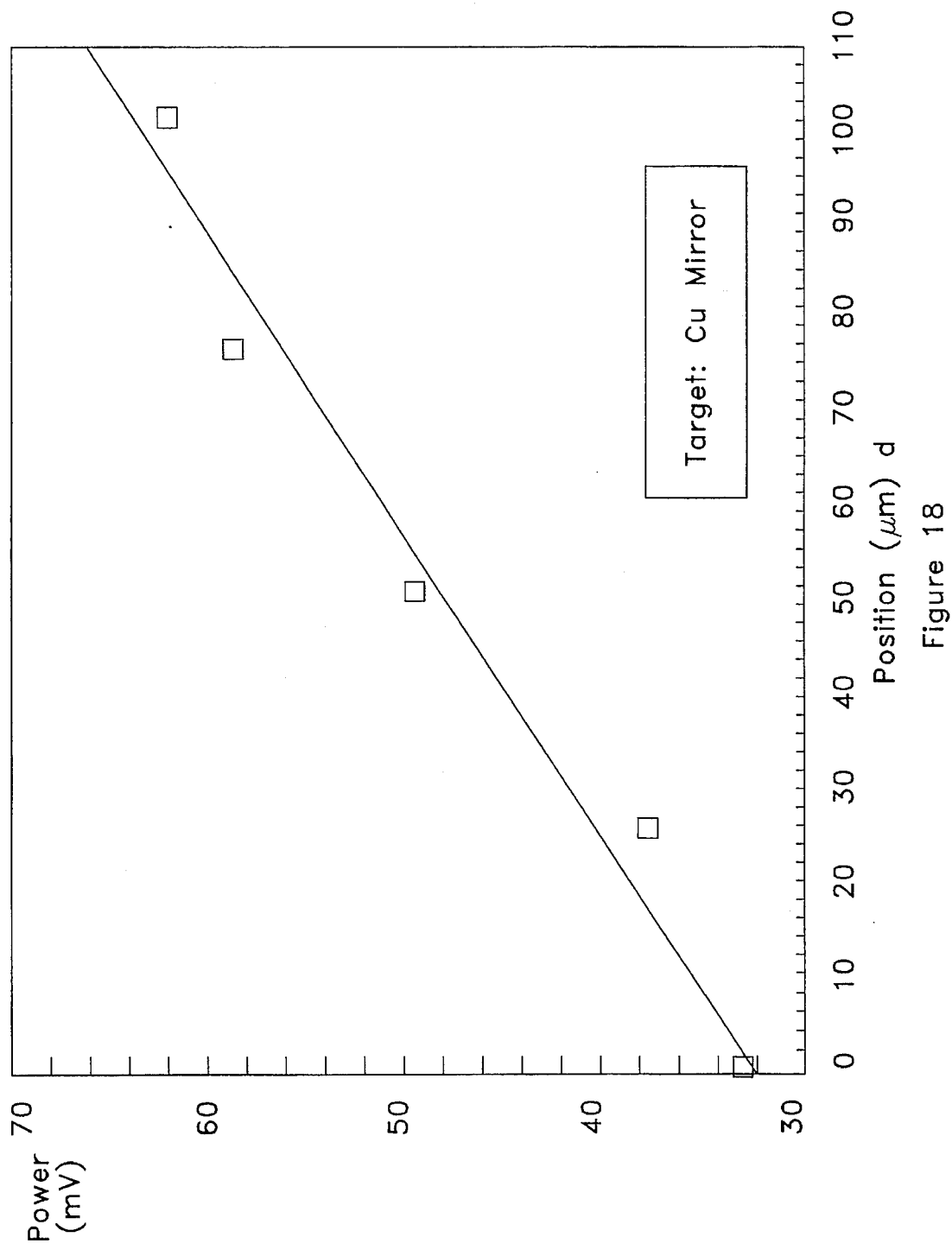
FIG. 18 shows output power at output 2 versus position of a target having a copper surface.

FIG. 18 shows output power at output 2 (proportional to voltage in mV output from detector 542 in position sensing system 500 of FIG. 15) versus position of target 538 having a copper surface as surface 534. As can be seen, the output 2 varied approximately linearly as distance d varied from about 0 micrometers to about 110 micrometers. The range and sensitivity of sensing system 520 can be by varying core/cladding diameter ratio, the wavelength of laser 510 and light collection optics at fiber end 530. Also, multiple fibers 522 can be used in parallel to further extend the range of positions which can be sensed by system 500.

Figure 19A:
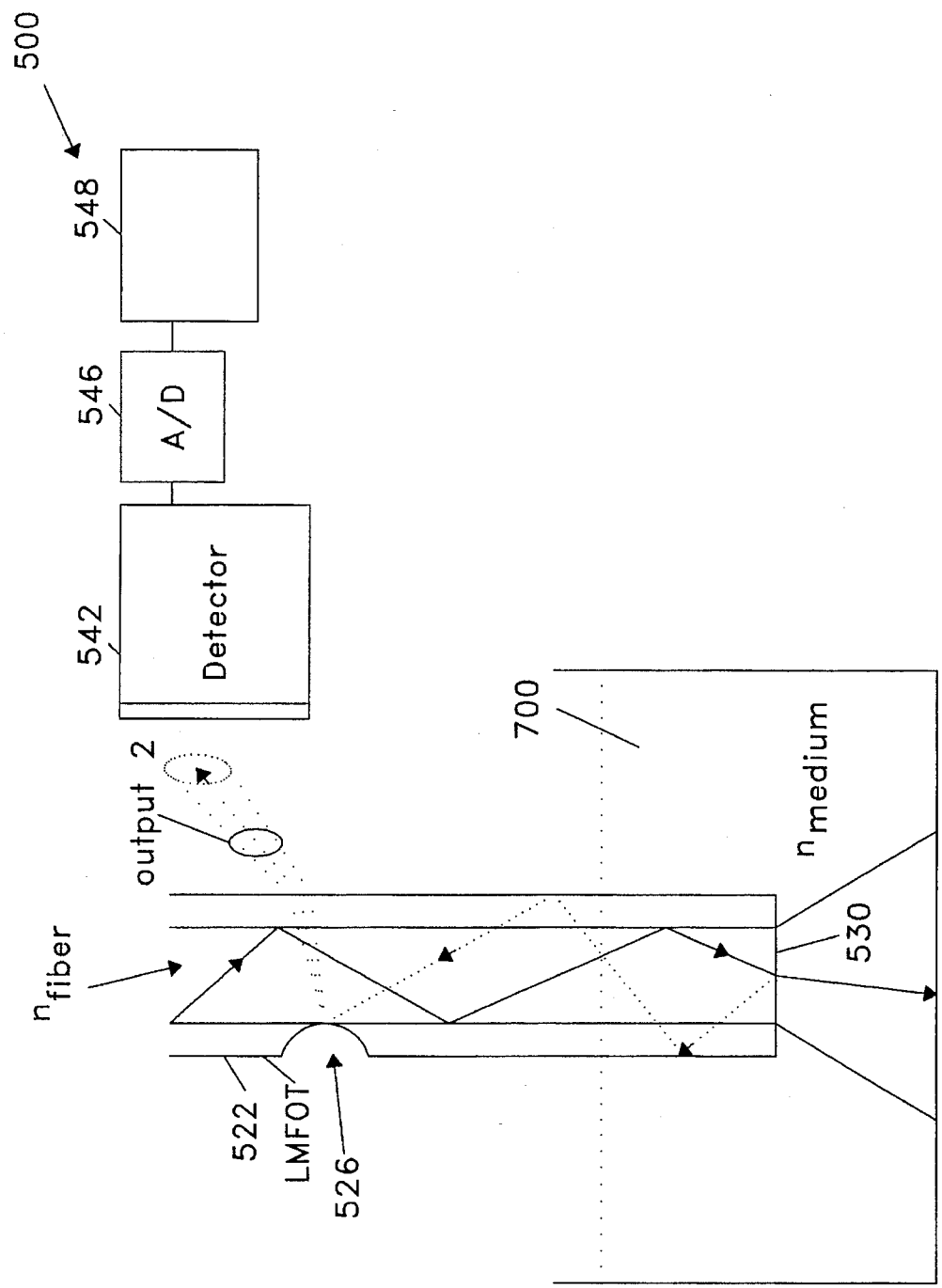
FIGS. 19A and 19B show the sensing system 500 being used to measure refractive index of various mediums 700 and results of those measurements, respectively.

FIG. 19A shows how sensing system 500 can measure refractive index n of a medium 700. As can be seen, fiber end 530 is inserted into a medium 700 with refractive index n to be measured.

Figure 19B:
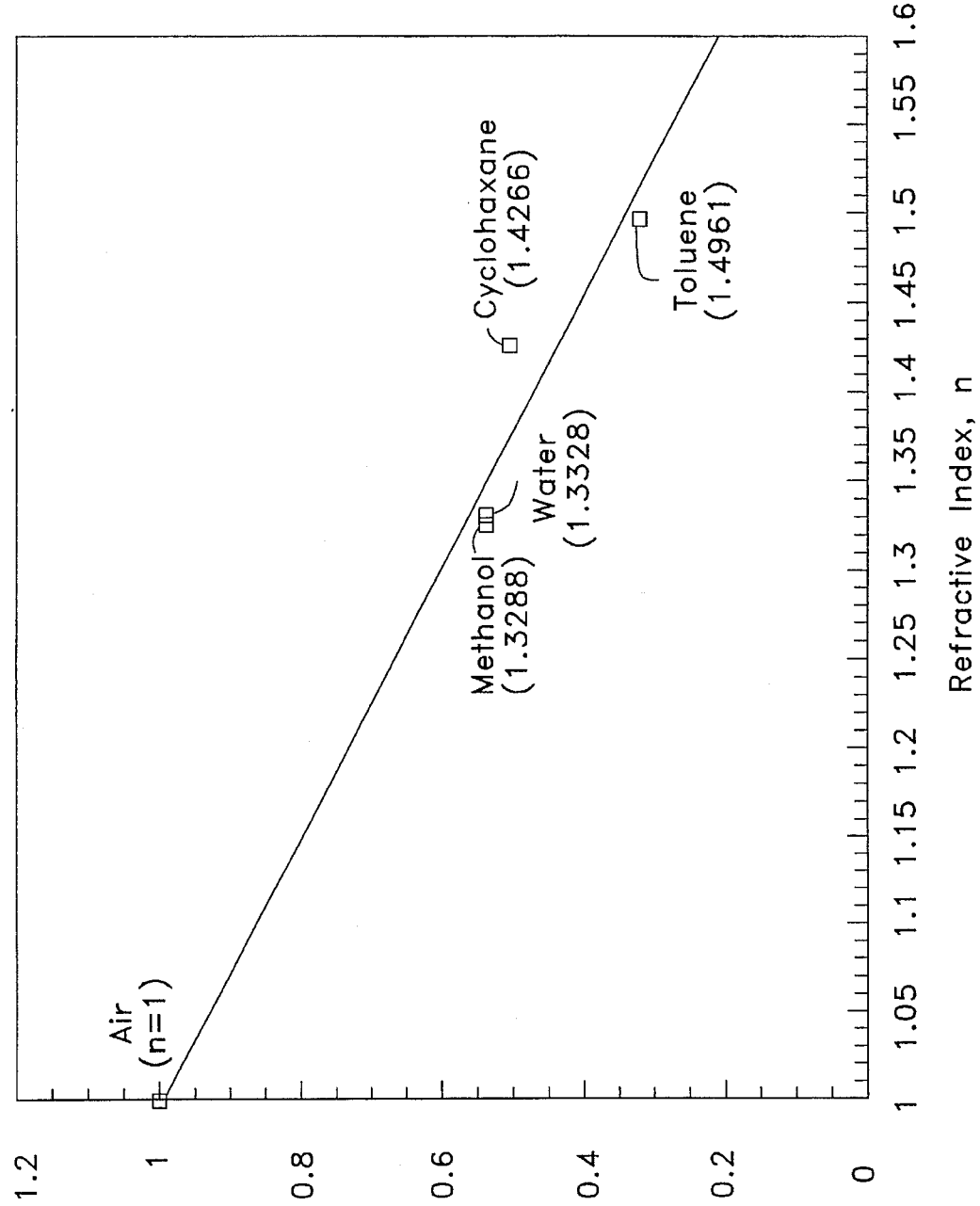

FIG. 19B shows results of measuring four different solutions. In particular, FIG. 19B shows methanol (n=1.3288), water (n=1.3288), cyclohaxane (n=1.4266) and toluene (n=1.4961).

Numerous and additional modifications and variations of the present invention are possible in light of the above teachings. It is therefore to be understood that within the scope of the appended claims, the invention may be practiced otherwise than as specifically claimed.

What is claimed is:

1. An apparatus for fabricating a tap in an optical fiber having an optical axis, comprising:
   an energy source for outputting a beam of energy equal to or greater than a threshold power;
   beam directing means for directing said beam of energy toward said optical fiber at an angle φ from the optical axis of the fiber, wherein said angle φ is not equal to approximately 90 degrees.

2. An optical fiber having a tap fabricated using comprising: an energy source for outputting a beam of energy equal to or greater than a threshold power and beam directing means for directing said beam of energy toward said optical fiber at an angle φ from the optical axis of the fiber, wherein said angle φ is not equal to approximately 90 degrees.

3. A method for fabricating a tap in an optical fiber having an optical axis, comprising the steps of:
   outputting a beam of energy at a threshold power;
   directing said beam of energy toward said fiber at an angle φ from the optical axis of the fiber, wherein said angle φ is not equal to approximately 90 degrees.

4. An optical fiber having an optical axis and having a tap fabricated according to a method comprising the steps of: outputting a beam of energy at a threshold power and directing said beam of energy toward said fiber at an angle φ from the optical axis of the fiber, wherein said angle φ is not equal to approximately 90 degrees.

5. An apparatus, comprising:
   an optical fiber having an optical axis.;
   an energy source for outputting a beam of energy equal to or greater than a threshold power;
   beam directing means for directing said beam of energy toward said optical fiber at an angle φ from the optical axis of the fiber, wherein said beam directing means directs said beam of energy at an angle φ not equal to approximately 90 degrees, thereby fabricating an asymmetric tap in said optical fiber.

6. An apparatus, comprising:
   an optical fiber having an optical axis;
   an energy source for outputting a beam of energy equal to or greater than a threshold power;
   beam directing means for directing said beam of energy toward said optical fiber at an angle φ from the optical axis of the fiber, wherein said beam directing means directs said beam of energy at an angle φ approximately equal to 45 degrees, thereby fabricating an asymmetric tap in said optical fiber.

7. The apparatus as claimed in claim 1, wherein said energy source is a carbon dioxide laser.

8. An apparatus, comprising:
   an optical fiber having an optical axis;
   an energy source for outputting a beam of energy equal to or greater than a threshold power;
   beam directing means for directing said beam of energy toward said optical fiber at an angle φ from the optical axis of the fiber, wherein said beam directing means comprises scanning means for scanning said beam of energy across the fiber at a scanning rate which maintains said threshold power.

9. An apparatus, comprising:
   an optical fiber having an optical axis;
   an energy source for outputting a beam of energy equal to or greater than a threshold power;
   beam directing means for directing said beam of energy toward said optical fiber at an angle φ from the optical axis of the fiber, wherein said beam directing means comprises focussing means for focussing said beam of energy into a spot having about a 240 micrometer diameter and said beam directing means directs said beam of energy at an angle φ of about 90 degrees, said tap thereby being a symmetrical Gaussian shaped tap.

10. An apparatus, comprising:
    an optical fiber having an optical axis;
    an energy source for outputting a beam of energy equal to or greater than a threshold power;
    beam directing means for directing said beam of energy toward said optical fiber at an angle φ from the optical axis of the fiber, wherein said beam directing means comprises focussing means for focussing said beam of energy into a spot having about a 60 micrometer diameter, said tap thereby being a symmetrical triangular shaped tap having a single output.

11. The apparatus as claimed in claim 10, wherein said scanning means scans across said fiber at a rate of about 45 millimeters per second.

12. The apparatus as claimed in claim 11, wherein said scanning means scans across said fiber at least twice yielding a symmetrical triangular shaped tap with an etch depth of at least about 4 micrometers.

13. An optical fiber having a variety of taps, each of said taps fabricated using an apparatus comprising: an energy source for outputting a beam of energy equal to or greater than a threshold power and beam directing means for directing said beam of energy toward said optical fiber at an angle φ from the optical axis of the fiber, wherein said angle φ is not equal to approximately 90 degrees.

14. The optical fiber as claimed in claim 13, wherein each of said plurality of taps has an associated mount.

15. The optical fiber as claimed in claim 14, wherein each of said associated mounts has a receptor.

16. An optical fiber having an optical axis and having a tap fabricated using an energy source for outputting a beam of energy equal to or greater than a threshold power and beam directing means for directing said beam of energy toward said optical fiber at an angle φ from the optical axis of the fiber, wherein said angle φ is not equal to approximately 90 degrees and wherein said tap is a symmetric triangular shaped tap.

17. An optical fiber having a tap fabricated using an apparatus for fabricating a tap in an optical fiber having an optical axis, comprising:
    an energy source for outputting a beam of energy equal to or greater than a threshold power;
    beam directing means for directing said beam of energy toward said optical fiber at an angle φ from the optical axis of the fiber, thereby fabricating said tap in the fiber, wherein said tap is a symmetric triangular shaped tap at least 4 micrometers deep.

18. An optical fiber having a tap fabricated using an apparatus for fabricating a tap in an optical fiber having an optical axis, comprising:
    an energy source for outputting a beam of energy equal to or greater than at a threshold power;
    beam directing means for directing said beam of energy toward said optical fiber at an angle φ from the optical axis of the fiber, thereby fabricating said tap in the fiber, wherein said tap has a tap angle between about 12 degrees and 35 degrees, thereby yielding an upper optical output above said tap, said upper optical output forming a corresponding angle between about 20 degrees and 60 degrees with respect to the optical axis of the optical fiber.

19. A method for fabricating a tap in an optical fiber having an optical axis, comprising the steps of:

outputting a beam of energy equal to or greater than a threshold power;

directing said beam of energy toward said fiber at an angle $\phi$ from the optical axis of the fiber, thereby fabricating said tap in the fiber, wherein said directing step comprises directing the beam of energy at an angle not equal to 90 degrees, thereby fabricating an asymmetric tap.

20. A method for fabricating a tap in an optical fiber having an optical axis, comprising the steps of:

outputting a beam of energy equal to or greater than a threshold power;

directing said beam of energy toward said fiber at an angle $\phi$ from the optical axis of the fiber, thereby fabricating said tap in the fiber, wherein said directing step comprises the step of scanning the beam of energy across the fiber at a scanning rate which maintains the threshold power.

21. The method as claimed in claim 3, wherein said outputting step comprises outputting a beam of carbon dioxide laser radiation.

22. A method for fabricating a tap in an optical fiber having an optical axis, comprising the steps of:

outputting a beam of carbon dioxide laser radiation energy equal to or greater than a threshold power; and directing said beam of carbon dioxide laser energy toward said fiber at an angle $\phi$ from the optical axis of the fiber, thereby fabricating said tap in the fiber, wherein said directing step further includes focussing the beam of carbon dioxide laser radiation into a spot having about a 240 micrometer diameter, the tap thereby being a symmetrical Gaussian shaped tap.

23. A method for fabricating a tap in an optical fiber having an optical axis, comprising the steps of:

outputting a beam of carbon dioxide laser radiation energy equal to or greater than a threshold power; and directing said beam of carbon dioxide laser energy toward said fiber at an angle $\phi$ from the optical axis of the fiber, thereby fabricating said tap in the fiber, wherein said directing step further includes focussing the beam of carbon dioxide laser radiation into a spot having about a 60 micrometer diameter, the tap thereby being a symmetrical 24. The method as claimed in claim 23, wherein said scanning step comprises scanning the beam of energy across the fiber at a rate of about 45 millimeters per second.

25. An optical fiber having an optical axis with a tap fabricated according to a method, comprising the steps of:

outputting a beam of energy equal to or greater than a threshold power;

directing said beam of energy toward said fiber at an angle $\phi$ from the optical axis of the fiber, thereby fabricating said tap in the fiber, wherein said tap is a symmetric triangular shaped tap.

26. An optical fiber having an optical axis with a tap fabricated according to a method, comprising the steps of:

outputting a beam of energy equal to or greater than a threshold power;

directing said beam of energy toward said fiber at an angle $\phi$ from the optical axis of the fiber, thereby fabricating said tap in the fiber, wherein said tap is a symmetric triangular shaped tap at least 4 micrometers deep.

27. An optical fiber having an .optical axis with a tap fabricated according to a method, comprising the steps of:

outputting a beam of energy equal to or greater than a threshold power;

directing said beam of energy toward said fiber at an angle $\phi$ from the optical axis of the fiber, thereby fabricating said tap in the fiber, wherein said tap has a tap angle between about 12 degrees and 35 degrees, thereby yielding an upper optical output above said tap, said upper optical output forming a corresponding angle between about 20 degrees and 60 degrees with respect to the optical axis of the optical fiber. triangular shaped tap.

28. An optical fiber comprising a variety of taps each fabricated according to a method comprising the steps of: outputting a beam of energy at a threshold power and directing said beam of energy toward said fiber at an angle $\phi$ from the optical axis of the fiber, wherein said angle $\phi$ is not equal to approximately 90 degrees.

29. The optical fiber as claimed in claim 28, wherein each of said plurality of taps has an associated mount.

30. The optical fiber as claimed in claim 29, wherein each of said associated mounts has a receptor.

31. The apparatus as claimed in claim 1, wherein said beam directing means directs said beam of energy at an angle $\phi$ not equal to approximately 90 degrees, thereby fabricating an asymmetric tap.

32. An apparatus, comprising:

an optical fiber having an optical axis;

an energy source for outputting a beam of energy equal to or greater than a threshold power;

beam directing means for directing said beam of energy toward said optical fiber at an angle $\phi$ from the optical axis of the fiber, wherein said beam directing means directs said beam of energy at an angle $\phi$ approximately equal to 45 degrees, thereby fabricating an asymmetric tap in said optical fiber.

33. An apparatus for fabricating a tap in an optical fiber having an optical axis, comprising:

an energy source for outputting a beam of energy equal to or greater than a threshold power; and beam directing means for directing said beam of energy toward said optical fiber at an angle $\phi$ from the optical axis of the fiber, wherein said angle $\phi$ is not equal to 90 degrees, and wherein said beam directing means comprises scanning means for scanning said beam of energy across the fiber at a scanning rate which maintains said threshold power.

34. An apparatus for fabricating a tap in an optical fiber having an optical axis, comprising:

an energy source for outputting a beam of energy equal to or greater than a threshold power; and beam directing means for directing said beam of energy toward said optical fiber at an angle $\phi$ from the optical axis of the fiber, wherein said energy source is a carbon dioxide laser and wherein said beam directing means comprises focussing means for focussing said beam of energy into a spot having about a 240 micrometer diameter and said beam directing means directs said beam of energy at an angle $\phi$ of about 90 degrees, said tap thereby being a symmetrical Gaussian shaped tap.

35. An apparatus for fabricating a tap in an optical fiber having an optical axis, comprising:

an energy source for outputting a beam of energy equal to or greater than a threshold power; and beam directing means for directing said beam of energy toward said optical fiber at an angle $\phi$ from the optical axis of the fiber, wherein said angle φ is not equal to 90 degrees, said energy source is a carbon dioxide laser, and said beam directing means comprises focussing means for focussing said beam of energy into a spot having about a 60 micrometer diameter, said tap thereby being a symmetrical triangular shaped tap having a single output.

36. An apparatus for fabricating a tap in an optical fiber having an..optical axis, comprising:

an energy source for outputting a beam of energy equal to or greater than a threshold power; and beam directing means for directing said beam of energy toward said optical fiber at an angle φ from the optical axis of the fiber, wherein said angle φ is not equal to 90 degrees, said energy source is a carbon dioxide laser, said beam directing means comprises focussing means for focussing said beam of energy into a spot having about a 60 micrometer diameter, said tap thereby being a symmetrical triangular shaped tap having a single output, and said scanning means scans across said fiber at a rate of about 45 millimeters per second.

37. An apparatus for fabricating a tap in an optical fiber having an optical axis, comprising:

an energy source for outputting a beam of energy equal to or greater than a threshold power; and beam directing means for directing said beam of energy toward said optical fiber at an angle φ from the optical axis of the fiber, wherein said angle φ is not equal to 90 degrees, said energy source is a carbon dioxide laser, said beam directing means comprises focussing means for focussing said beam of energy into a spot having about a 60 micrometer diameter, said tap thereby being a symmetrical triangular shaped tap having a single output, said scanning means scans across said fiber at a rate of about 45 millimeters per second, and said scanning means scans across said fiber at least twice yielding a symmetrical triangular shaped tap with an etch depth of at least about 4 micrometers.

38. The optical fiber as claimed in claim 2, wherein said tap is a symmetric triangular shaped tap.

39. The optical fiber as claimed in claim 2, wherein said tap is a symmetric triangular shaped tap at least 4 micrometers deep.

40. An optical fiber having an optical axis and having a tap fabricated using an energy source for outputting a beam of energy equal to or greater than a threshold power and beam directing means for directing said beam of energy toward said optical fiber at an angle φ from the optical axis of the fiber, wherein said angle φ is not equal to 90 degrees, and wherein said tap has a tap angle between about 12 degrees and 35 degrees, thereby yielding an upper optical output above said tap, said upper optical output forming a corresponding angle between about 20 degrees and 60 degrees with respect to the optical axis of the optical fiber.

41. The method as claimed in claim 3, wherein said directing step comprises directing the beam of energy at an angle φ not equal to approximately 90 degrees, thereby fabricating an asymmetric tap.

42. A method for fabricating a tap in an optical fiber having an optical axis, comprising the steps of:

outputting a beam of energy at a threshold power; and directing said beam of energy toward said optical fiber at an angle φ from the optical axis of the fiber, wherein said angle φ is not equal to 90 degrees, and wherein said directing step comprises the step of scanning the beam of energy across the fiber at a scanning rate which maintains the threshold power.

43. A method for fabricating a tap in an optical fiber having an optical axis, comprising the steps of:

outputting a beam of energy at a threshold power; and directing said beam of energy toward said optical fiber at an angle φ from the optical axis of the fiber, wherein said angle φ is not equal to 90 degrees, wherein said outputting step comprises outputting a beam of carbon dioxide laser radiation, and wherein said directing step further includes focussing the beam of carbon dioxide laser radiation into a spot having about a 240 micrometer diameter, the tap thereby being a symmetrical Gaussian shaped tap.

44. A method for fabricating a tap in an optical fiber having an optical axis, comprising the steps of:

outputting a beam of energy at a threshold power; and directing said beam of energy toward said optical fiber at an angle φ from the optical axis of the fiber, wherein said angle φ is not equal to 90 degrees, wherein said outputting step comprises outputting a beam of carbon dioxide laser radiation, and wherein said directing step further includes focussing the beam of carbon dioxide laser radiation into a spot having about a 60 micrometer diameter, the tap thereby being a symmetrical triangular shaped tap.

45. A method for fabricating a tap in an optical fiber having an optical axis, comprising the steps of:

outputting a beam of energy at a threshold power;

directing said beam of energy toward said optical fiber at an angle φ from the optical axis of the fiber, wherein said angle φ is not equal to 90 degrees, wherein said outputting step comprises outputting a beam of carbon dioxide laser radiation, wherein said directing step further includes focussing the beam of carbon dioxide laser radiation into a spot having about a 60 micrometer diameter, and scanning the beam of energy across the fiber at a rate of about 45 millimeters per second, the tap thereby being a symmetrical triangular shaped tap.

46. The optical fiber as claimed in claim 4, wherein said tap is a symmetric triangular shaped tap.

47. The optical fiber as claimed in claim 4, wherein said tap is a symmetric triangular shaped tap at least 4 micrometers deep.

48. An optical fiber having an optical axis with a tap fabricated by outputting a beam of energy at a threshold power and directing said beam of energy toward said fiber at an angle φ from the optical axis of the fiber, wherein said angle φ is not equal to 90 degrees, and wherein said tap has a tap angle between about 12 degrees and 35 degrees, thereby yielding an upper optical output above said tap, said upper optical output forming a corresponding angle between about 20 degrees and 60 degrees with respect to the optical axis of the optical fiber.

* * * * *